(12) United States Patent
Frishberg

(10) Patent No.: US 8,085,812 B2
(45) Date of Patent: *Dec. 27, 2011

(54) SYMBOLIC REPRESENTATION OF PROTOCOL-LAYER INFORMATION

(75) Inventor: Leo David Frishberg, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 426 days.

This patent is subject to a terminal disclaimer.

(21) Appl. No.: 11/690,800

(22) Filed: Mar. 23, 2007

(65) Prior Publication Data

US 2008/0144618 A1    Jun. 19, 2008

Related U.S. Application Data

(63) Continuation-in-part of application No. 11/612,639, filed on Dec. 19, 2006.

(51) Int. Cl.
*H04J 3/16* (2006.01)

(52) U.S. Cl. ........ 370/469; 370/241; 370/389; 370/466; 715/734

(58) Field of Classification Search .............. 370/389, 370/392, 466, 469; 709/230, 238; 345/440, 345/736, 734

See application file for complete search history.

(56) References Cited

U.S. PATENT DOCUMENTS

| | | | | |
|---|---|---|---|---|
| 5,684,954 A * | 11/1997 | Kaiserswerth et al. | ....... | 709/236 |
| 5,768,552 A * | 6/1998 | Jacoby | ........... | 345/441 |
| 5,805,118 A | 9/1998 | Mishra et al. | | |
| 6,034,963 A * | 3/2000 | Minami et al. | ................ | 370/401 |
| 6,639,607 B1 * | 10/2003 | Ferguson et al. | ............ | 715/734 |
| 6,683,993 B1 * | 1/2004 | Mead | ............................ | 382/253 |
| 6,708,337 B2 | 3/2004 | Moysan et al. | | |
| 6,976,080 B1 | 12/2005 | Krishnaswamy et al. | | |
| 7,379,078 B1 * | 5/2008 | Gossweiler et al. | .......... | 345/660 |
| 7,386,628 B1 * | 6/2008 | Hansell et al. | ................ | 709/238 |
| 2001/0015984 A1 * | 8/2001 | Lenz et al. | .................... | 370/469 |
| 2001/0035971 A1 * | 11/2001 | Koakutsu et al. | ............ | 358/1.13 |
| 2002/0085549 A1 * | 7/2002 | Reza et al. | .................... | 370/389 |
| 2003/0103077 A1 | 6/2003 | Despotidis et al. | | |
| 2003/0223423 A1 * | 12/2003 | Yu et al. | ........................ | 370/392 |
| 2004/0100468 A1 * | 5/2004 | Tenten et al. | ................. | 345/440 |
| 2004/0109453 A1 * | 6/2004 | Wirth | ............................ | 370/393 |
| 2004/0196308 A1 * | 10/2004 | Blomquist | .................... | 345/734 |
| 2006/0268406 A1 | 11/2006 | McMahon et al. | | |
| 2007/0030812 A1 * | 2/2007 | Mac Donald et al. | ........ | 370/241 |
| 2008/0255784 A1 * | 10/2008 | Gamper et al. | ................. | 702/67 |

OTHER PUBLICATIONS

Understanding IP Networking—Voice Over IP, a TRA publication, published Mar. 17, 2000, pp. 3-4, 3-6, and 3-8.
Webster's II New Riverside Dictionary, p. 451, definition of "polygon", copyright, 1984.

(Continued)

*Primary Examiner* — Ricky Ngo
*Assistant Examiner* — Rasheed Gidado
(74) *Attorney, Agent, or Firm* — Derek Meeker; Thomas F. Lenihan; Francis I. Gray

(57) ABSTRACT

A method of displaying protocol-specific data includes receiving data, extracting protocol-specific information from the data, converting protocol-specific information into a symbolic representation, and presenting the symbolic representation. A dimension of symbols of the symbolic representation differentiates protocol layers.

A test and measurement instrument for displaying data includes an acquisition system configured to receive an input signal, a processor coupled to the acquisition system and configured to generate a symbolic representation of protocol-specific information within the input signal, and a user interface coupled to the processor and configured to present the symbolic representation. A dimension of symbols of the symbolic representation differentiates protocol layers.

12 Claims, 16 Drawing Sheets

OTHER PUBLICATIONS

U.S. Appl. No. 11/612,639, filed Dec. 19, 2006: "Symbolic Representation of Protocol Specific Information", Inventors: Leo Frishberg and Eric Gould Bear.

U.S. Appl. No. 11/740,135, filed Mar. 23, 2007: "Schematic Display of Protocol-Specific Information", Inventors: Leo Frishberg and Eric Gould Bear.

Understanding IP Networking—Voice over IP, a TRA publication, pp. 3-4, 3-6, and 3-8, published Mar. 17, 2000.

Webster's II, New Riverside Dictionary, copyright 1984, p. 541, showing the definition of "polygon".

* cited by examiner

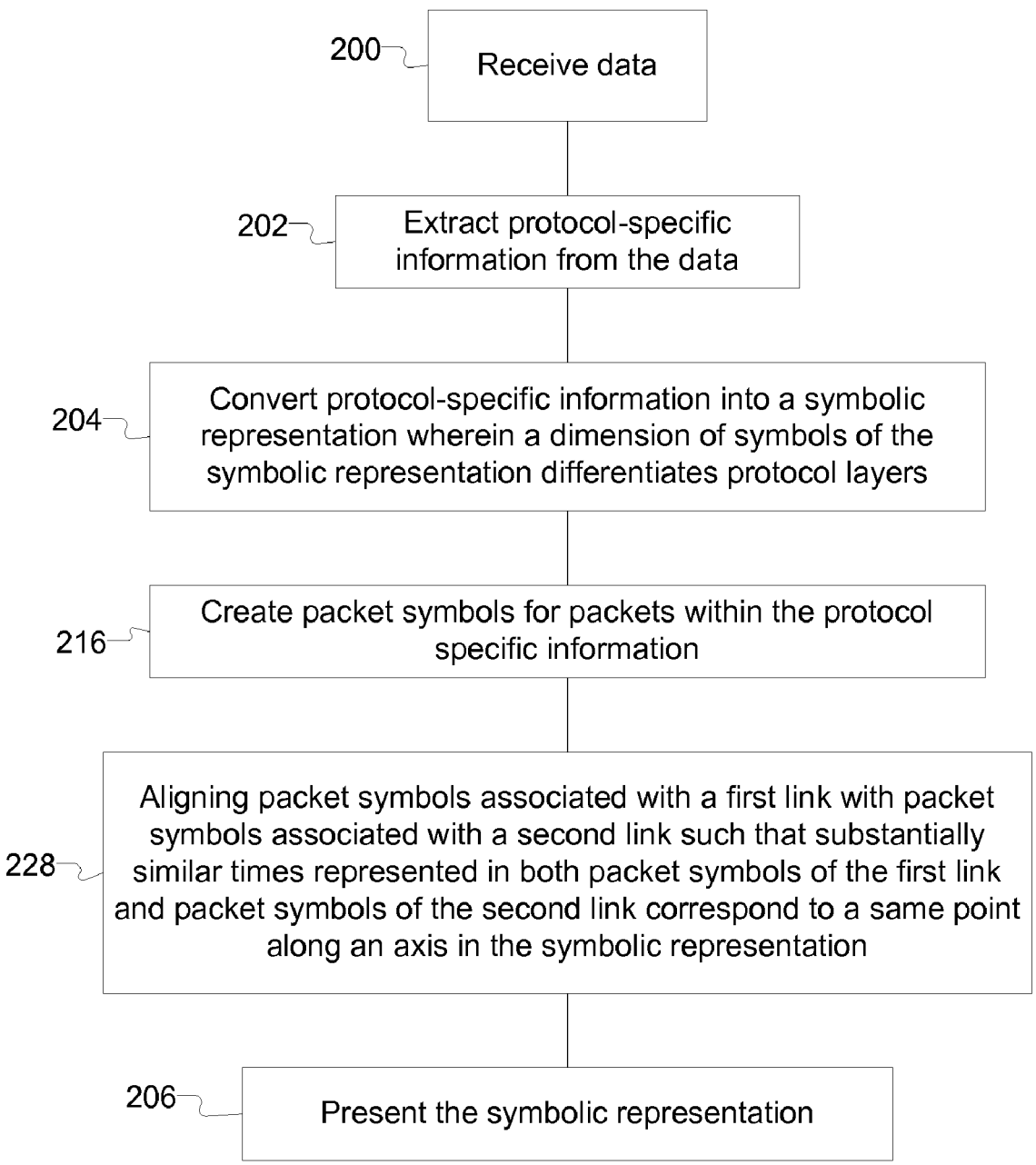

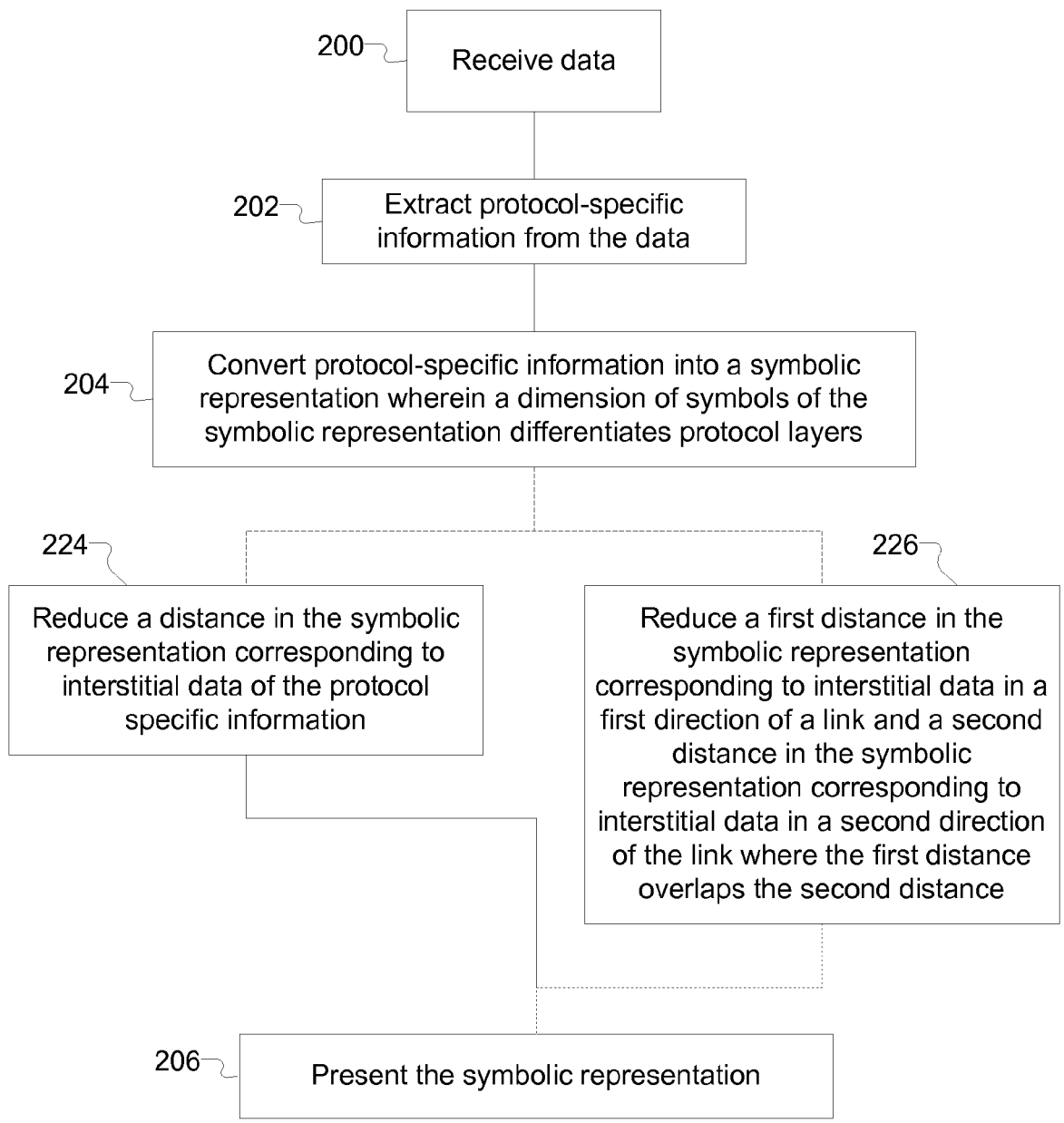

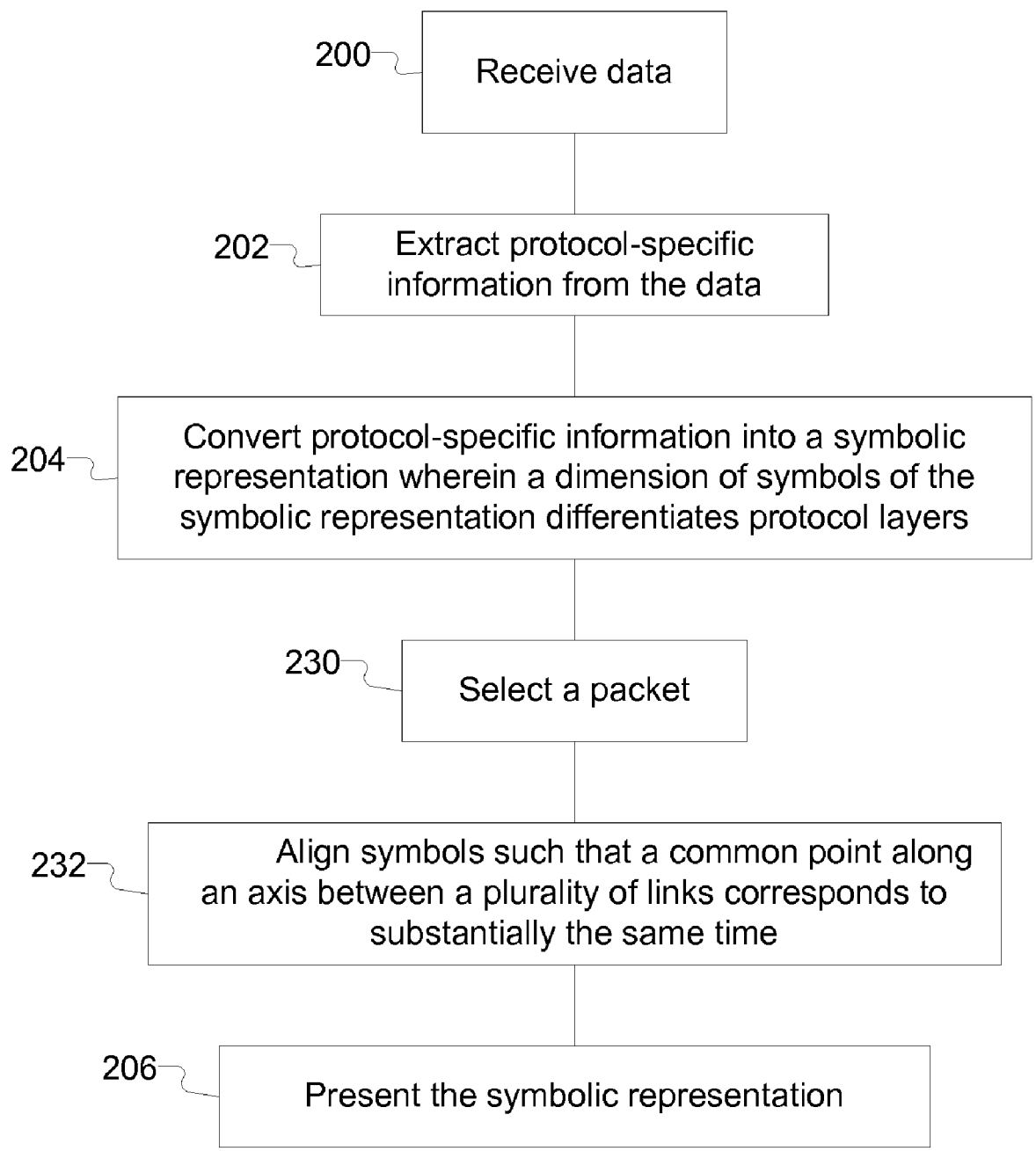

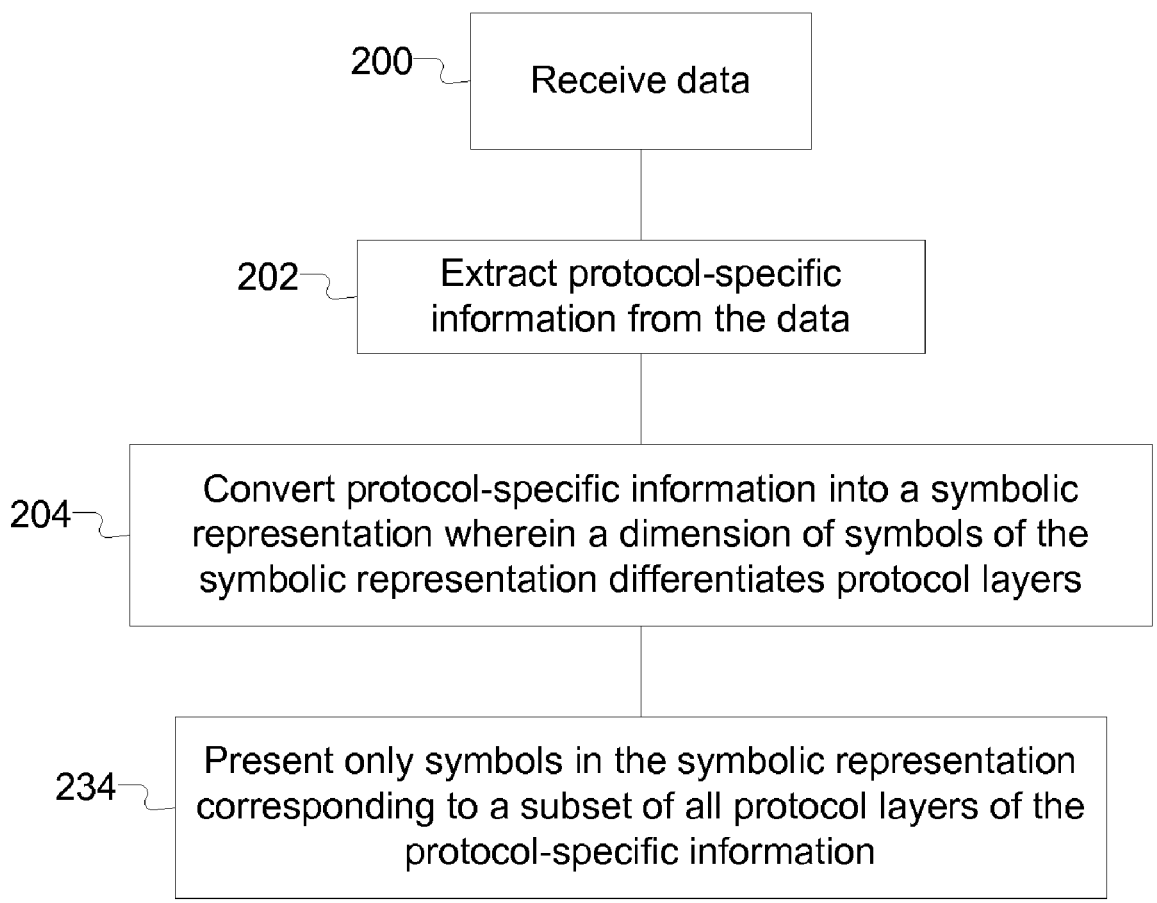

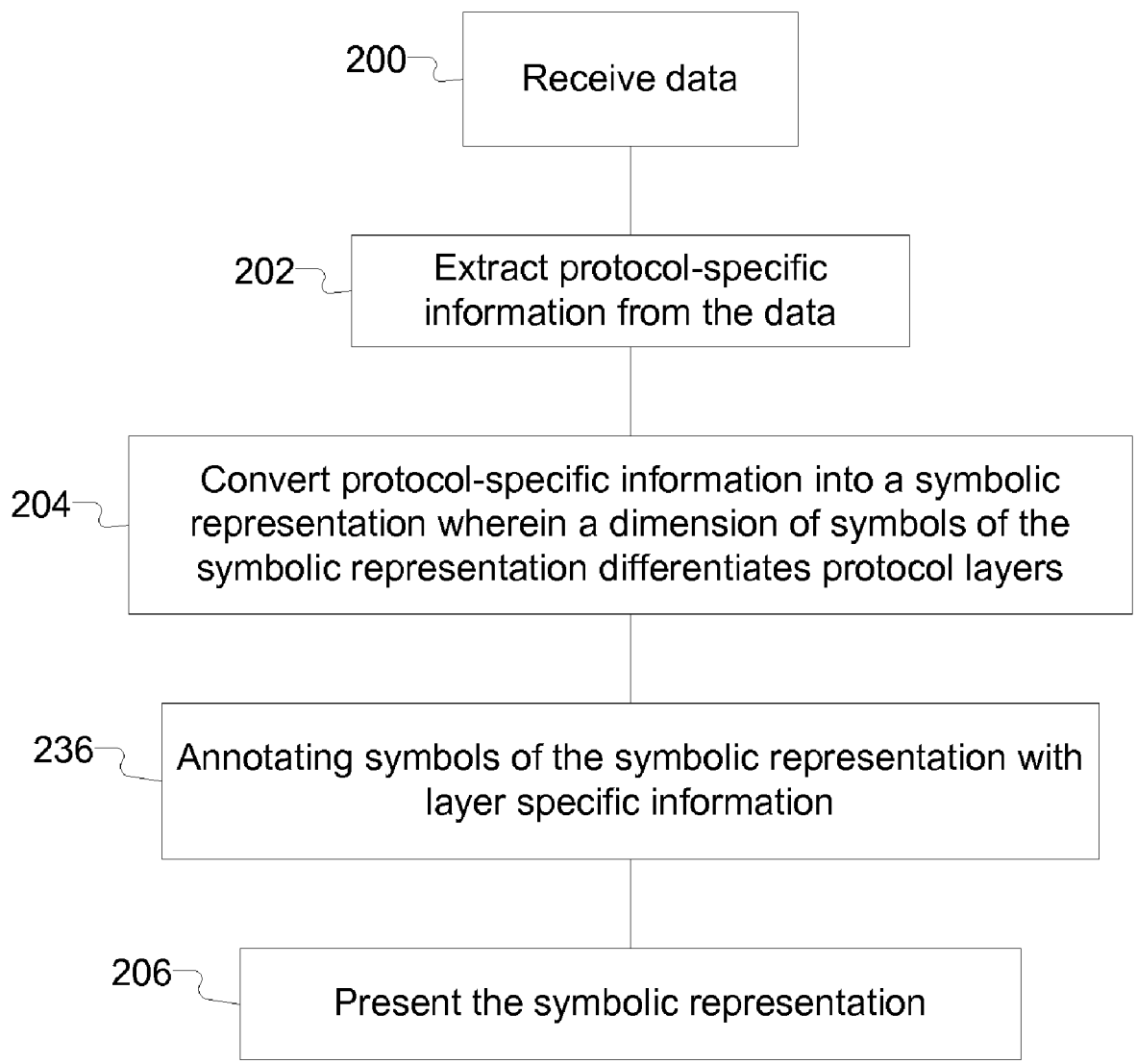

SYMBOLIC REPRESENTATION OF PROTOCOL-LAYER INFORMATION

CROSS-REFERENCE TO RELATED APPLICATION

This application is a continuation-in-part of commonly assigned co-pending U.S. patent application Ser. No. 11/612,639 entitled "Symbolic Representation Of Protocol-Specific Information," filed on Dec. 19, 2006, the subject matter of which we incorporate by reference.

BACKGROUND

This disclosure relates to test and measurement instruments, and in particular, to test and measurement instruments for presenting protocol-layer information.

Analyzing and debugging systems using communications among their components has become increasingly difficult. Rising complexity, increasing performance, and variety of protocols within a circuit present difficult obstacles for validation engineers attempting to identify and track errors.

A protocol analyzer is an instrument that is designed to display, validate, and measure communications. Such communications may include data in a variety of protocols. The protocol analyzer typically presents packets and transactions for analysis by a user. The packets and transactions are typically represented in a "box car" format by displaying boxes with a text label for a field of a packet and a text message corresponding to the data within the field. A color may be used to distinguish fields from one another.

Unfortunately, data from differing protocols or differing protocol layers are displayed in the same "box car" format. Thus, without a detailed inspection of a field of the data, the user cannot determine a difference between the protocols, protocol layers, or between packets within a protocol. In addition, the box car diagrams for different protocols may be displayed in separate screens, making it difficult to correlate events among the protocols.

In addition, packets are commonly displayed with earlier fields on the left and later fields on the right. Subsequent packets are displayed below older packets. Although a packet may have a field indicating a time, there is no visual indicator of the time relationship of the packets. In particular, there is no visual indicator of a time relationship between packets from different channels or communications links. Thus, it is difficult for a user to correlate the occurrence of packets over time. Although a user may reorder the packets to view packets associated with a particular transaction, there is no visual indication of the time relationship of that transaction with other packets or transactions.

Furthermore, a user may zoom in or out on the display of the packets. However, since the information contained within the fields of the packets are represented by text, as a user zooms out, the text eventually becomes unintelligible. Thus, it is difficult for a user to both view a large number of packets and still be able to determine the information contained within the packet.

Users are typically most interested in errors. A different color may indicate that a field, packet or other structure may include an error. However, since color has been used extensively to identify different fields, a different color for an error does not draw the user's attention to it in a sea of other colors. In addition, users are able to arbitrarily assign colors. As a result, the effectiveness of color to indicate an error is reduced further.

Accordingly, a need remains for an improved display of protocol-layer information.

SUMMARY

A method of displaying protocol-specific data includes receiving data, extracting protocol-specific information from the data, converting protocol-specific information into a symbolic representation, and presenting the symbolic representation. A dimension of symbols of the symbolic representation differentiates protocol layers.

A test and measurement instrument for displaying data includes an acquisition system configured to receive an input signal, a processor coupled to the acquisition system and configured to generate a symbolic representation of protocol-specific information within the input signal, and a user interface coupled to the processor and configured to present the symbolic representation. A dimension of symbols of the symbolic representation differentiates protocol layers.

A display layout for displaying data on a test and measurement instrument includes a plurality of packet symbols, each packet symbol corresponding to a packet in the data and including at least one symbol having a dimension representing a protocol layer of the packet, and an axis along which the packet symbols are sequentially arranged.

BRIEF DESCRIPTION OF THE DRAWINGS

FIG. 17 is a flowchart illustrating how packet symbols of various links are aligned in a method of displaying protocol-specific information according to an embodiment of the invention.

FIG. 18 is a flowchart illustrating how distances corresponding to interstitial data are reduced in a method of displaying protocol-specific information according to various embodiments of the invention.

FIG. 19 is a flowchart illustrating how packet symbols are aligned using a selected packet in a method of displaying protocol-specific information according to an embodiment of the invention.

FIG. 20 is a flowchart illustrating how a subset of protocol layers is presented in a method of displaying protocol-specific information according to an embodiment of the invention.

FIG. 21 is a flowchart illustrating how packet symbols are annotated in a method of displaying protocol-specific information according to an embodiment of the invention.

DETAILED DESCRIPTION

Figure 1:
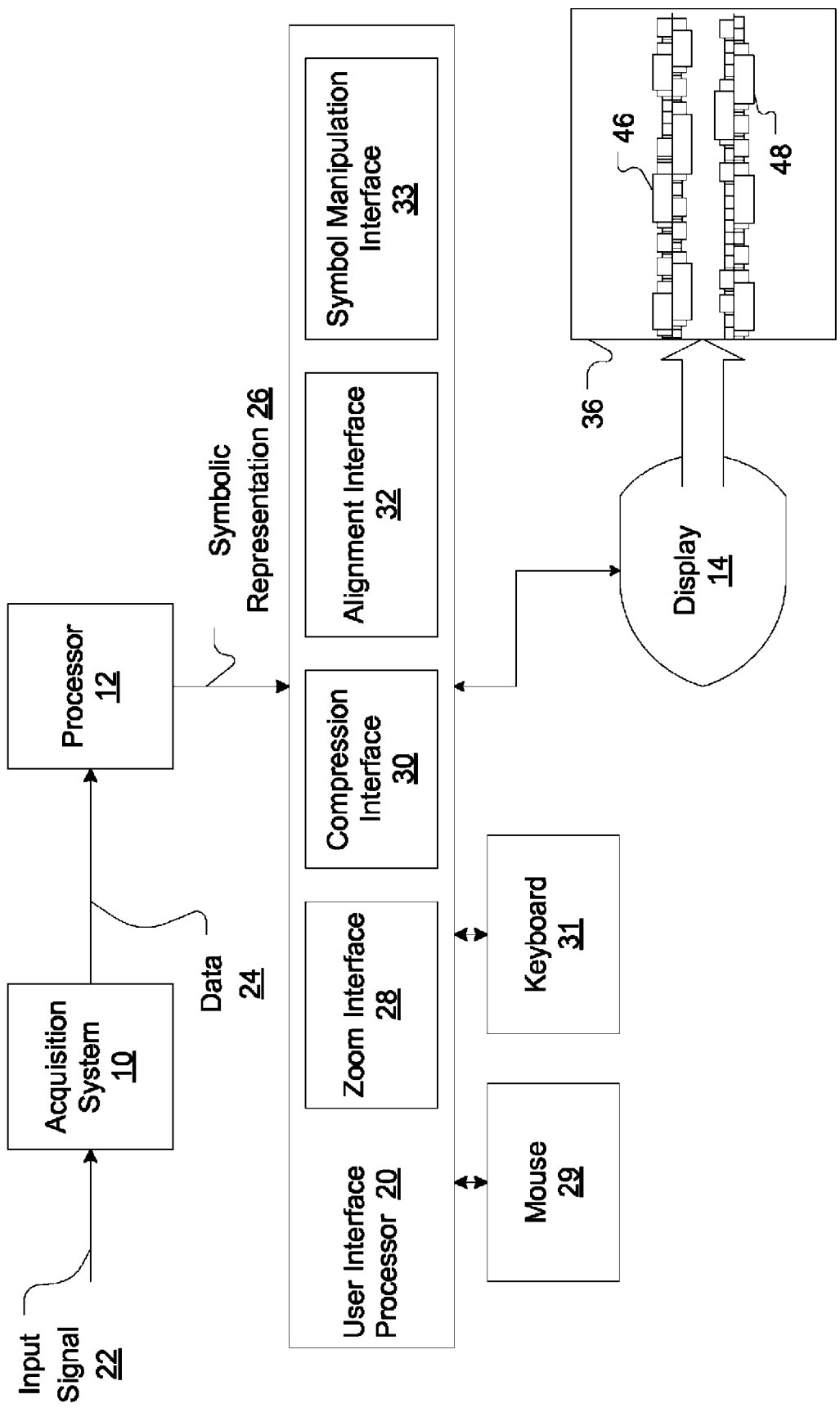
FIG. 1 is a block diagram of a test and measurement instrument providing a symbolic representation of protocol-layer information according to an embodiment of the invention.

FIG. 1 is a block diagram of a test and measurement instrument providing a symbolic representation of protocol-layer information according to an embodiment of the invention. The test and measurement instrument includes an acquisition system 10, a processor 12, a display 14, and a user interface processor 20. The acquisition system 10 is configured to receive an input signal 22. The acquisition system 10 converts the input signal 22 into data 24.

In one embodiment, the test and measurement instrument is a logic analyzer. The acquisition system 10 can be a probe and associated circuitry to sense the input signal 22 within a device under test (DUT) and convert the input signal 22 into the data 24. In another embodiment, the acquisition system 10 can include one or more processors to aid in converting the input signal 22 into the data 24. Any combination of circuitry that converts the input signal 22 into data 24 representing the input signal 22 can be an acquisition system 10.

The processor 12 is coupled to the acquisition system and is configured to generate a symbolic representation 26 of protocol-specific information within the input signal 22. Using the logic analyzer example described above, the input signal 22 can be electronic signals on the DUT. These signals can represent data 24 embodied by the input signal 22. The data 24 can be further categorized if it complies with a protocol. As a result, groups of the data 24 may correspond to data organizations defined by the protocol.

The processor 12 can be a variety of devices. Such devices include general purpose processors, application specific integrated circuits, programmable logic devices, multi-processor systems, or the like. In addition, the processor 12 may be any combination of such devices.

Protocol-specific information is the abstraction of the data 24 according to one or more protocols. For example, a protocol may define a packet including a header and a data payload. When the data 24 is received, it may be analyzed to determine if it complies with the protocol. If so, a first portion of the data 24 can correspond to a packet. Within that first portion, a second portion corresponds to the header and a third portion corresponds to the data payload. These examples illustrate that the protocol-specific information includes information such as the existence of a packet, the existence of a header, the contents of the header, compliance of the packet with the protocol, or any other relationship between the data 24 and the protocol.

Protocol-specific information is not limited to any specific implementation or medium. For example, the protocol-specific information may be associated with a serial implementation, a parallel implementation, a combination of serial and parallel implementation, or the like. Furthermore, such protocols may be embodied in a variety of media. For example, as described above, the protocol may be embodied in serial communications between electronic components of a system. Alternatively, the protocol may be embodied in a wireless link between infrared devices. The protocol-specific information may describe communications in any implementation or media.

Although the protocol may be a single protocol, the protocol is not limited to only one protocol or any particular subset of the protocol. For example, one protocol may be encapsulated within another protocol within the data 24. Alternatively, one protocol may have a variety of layers defined for communications within the data 24. For example, a physical layer, a data-link layer, and a transaction layer may simultaneously exist in the data 24 in a PCI Express system. Any number of protocols, layers, or the like may exist within the data 24.

A protocol layer is a grouping of data according to one or more protocols. The protocol layers can be divided according to functions. For example, a protocol can include a physical layer, a data-link layer, and a transaction layer. Data associated with the physical layer may focus on hardware specific implementations, the particular media, signal types, or the like involved in the communications. The data-link layer may focus on identification or addressing of devices involved in the communications. The transaction layer may focus on types of communications between the devices.

Protocol layers can be defined by separate protocols. For example, the physical layer, data-link layer, and transaction layer described above can each be defined by a separate protocol. In particular, communications may allow for multiple transaction-type layers to simultaneously exist with a protocol defining each transaction-type layers.

Furthermore, a protocol layer as used in this description is not limited to a standardized protocol layer such as a physical layer or data-link layer. In particular, a protocol layer can include groupings of data within such standardized layers. For example, the data-link layer may define operations such as querying for devices and establishing connections between the devices. The grouping of data associated with the querying can be a protocol layer, just as the grouping of the establishing of the communications.

Protocol-layer specific information is a grouping of protocol-specific information according to protocol layers. In an example, a protocol layer can define a format for a header and a payload. The payload can include data according to different layers. The payload can, but need not be considered part of the same layer as the header. For example, the header alone, and the header and the payload can be considered protocol-layer specific information.

From the protocol-specific information, the processor 12 generates a symbolic representation 26. Fields, data, states, protocol layers, and other concepts or associations defined by the protocol are associated with the symbolic representation.

Symbols are associated with packets, headers, fields, information, states, or the like defined by the protocol. In this context, a symbol is a graphical or other abstract visual representation of the protocol-specific information. Symbols can be constructed by varying a wide variety of characteristics. Such characteristics include shape, size, in-fill, line type, line width, color, ornamentation, deformation, or the like.

The symbolic representation is a collection of symbols. The symbolic representation includes the meaning behind the individual symbols. In addition, the symbolic representation may include a representation of protocol-specific information and thus have meaning extending beyond the individual symbols themselves. For example, symbols representing packets may be displayed from right to left on a display according to the time the packets were received. Thus, through the placement of symbols in relationship to one another, the user may visually comprehend a time relationship between the packets. In particular, the distance of the positioning may be proportional to time. The symbolic representation 26 can include such relationships.

A symbolic representation allows for a greater information density than other textual representation. For example, as size decreases, a symbol may retain enough identifying features to still convey the information embodied by the symbol. In contrast, for a similar decrease in size, text may become unreadable. Since symbols may be decreased in size more so than text without affecting the delivery of information, more symbols may be displayed on a given display.

The symbols and the symbolic representation as used herein are distinct from textual representation using text to convey information. When using text, a higher level of cognition is required to interpret the text that is not required to interpret the meaning of the symbols. The interpretation of symbols is performed by the "perceptual" process of a user's brain. Visual processing within the brain may be invoked without higher level cognitive functions such as language, reasoning, etc. For example, an acknowledgement packet may be represented by a symbol with a check mark. Thus, the user may see the check mark and without having to process the word "acknowledgment" or even the abbreviation "ACK", the user is informed of the acknowledgement packet. In the symbolic representation, the use of labels, numbers, text and other elements that require cognitive processing can be minimized or eliminated altogether.

The data 24 may be interpreted to represent ASCII "symbols". However, this "symbolic" representation is only a lower level of a textual visualization. The user must still interpret the meaning of the text formed by the ASCII symbols to obtain the information represented by the text. Thus, symbols are distinguished in that the meaning represented by the symbol can be directly interpreted from the symbol without having to interpret an intermediate meaning as with text.

The use of symbols provides several advantages. For example, as described above, the interpretation of the symbols uses a lower level of cognition that is inherent in the way we see. Patterns, errors, and other artifacts from a symbolic representation of protocol-specific information are easily distinguished from other "uninteresting data" also displayed.

Differing protocols and protocol layers may be used within the input signal 22. The different protocols and protocol layers may be represented by differing symbols. Thus, relationships of data conforming to the various protocols may be displayed such that the protocols are distinguished, yet the relationships among the various protocols may still be seen.

In an embodiment, a dimension of symbols of the symbolic representation differentiates protocol layers. As used in this discussion, a dimension is an aspect of a symbol related to a displayed distance, position, location, or the like. Height, width, and depth are examples of a dimension of a symbol. A radius or an angle can be a dimension of a symbol. Any aspect of a symbol that is quantifiable and changes a display of the symbol as that aspect changes can be a dimension. The display 14 presents the protocol-layering scheme in the protocol-specific information directly through the change in the dimension of symbols.

The display 14 is configured to display the symbolic representation. A symbolic display 36 in FIG. 1 illustrates an example of a symbolic representation of the protocol-specific information within the data 24. A symbolic display refers to a displayed symbolic representation. In this example, two links 46 and 48 have been displayed, as polygons. Although one particular example has been given in FIG. 1, more detail will be provided below for other examples. Furthermore, the display 14 is not limited to the geometric symbols illustrated in the symbolic display 36.

In one embodiment, the test and measurement instrument includes a user interface processor 20 to adjust the symbolic representation. For example, the user interface processor 20 is configured to handle interaction of the user with the symbolic representation 26. As will be described below, the user interface processor 20 can provide a variety of interfaces to the symbolic representation 26. In addition, the user interface processor 20 can handle the display or presentation of the symbolic representation 26 in the symbolic display 36.

The symbolic representation 26 from the processor 12 can have all of the information needed to be presented on a display 14. For example, the symbolic representation can include orientation information defining the layout of the symbols. Alternatively, the symbolic representation can include only the symbols, relying on the user interface processor 20 to arrange them in a symbolic display 36.

The adjustment by the user interface processor 20 can be in response to a user input. The user interface processor 20 can receive the user input in a variety of forms. For example, the user interface processor 20 can receive input from devices such as keyboards 31, buttons, knobs, dials, sliders, computer mice 29 or the like. The user interface processor 20 can receive input from physical interfaces or virtual representations of interfaces, such as a graphical representation of a knob, button, slider, or the like.

In addition, the user interface processor 20 can communicate with a portion of the display 14. Thus, options or controls for the user interface processor 20 can be communicated to the user through the display 14. The user can provide input through devices that are related to the displayed user interface. Furthermore, the user interface processor 20 can include remote interfaces coupled to the test and measurement instrument through a communications link such as a mouse, remote control, remote workstation, or the like.

The user interface processor 20 can handle any processing, interfaces, communications, or the like between any implementations of any parts of the user interface. In one embodiment, the user interface processor 20 can handle the various presentation and human input processing tasks. In addition, the user interface processor 20 can handle communications between the user interface and any other devices of the test and measurement instrument. Furthermore, although illustrated as distinct from the processor 12, the user interface processor 20 and the processor 12 can include parts of the same device, including distinct and common parts.

Figure 2:
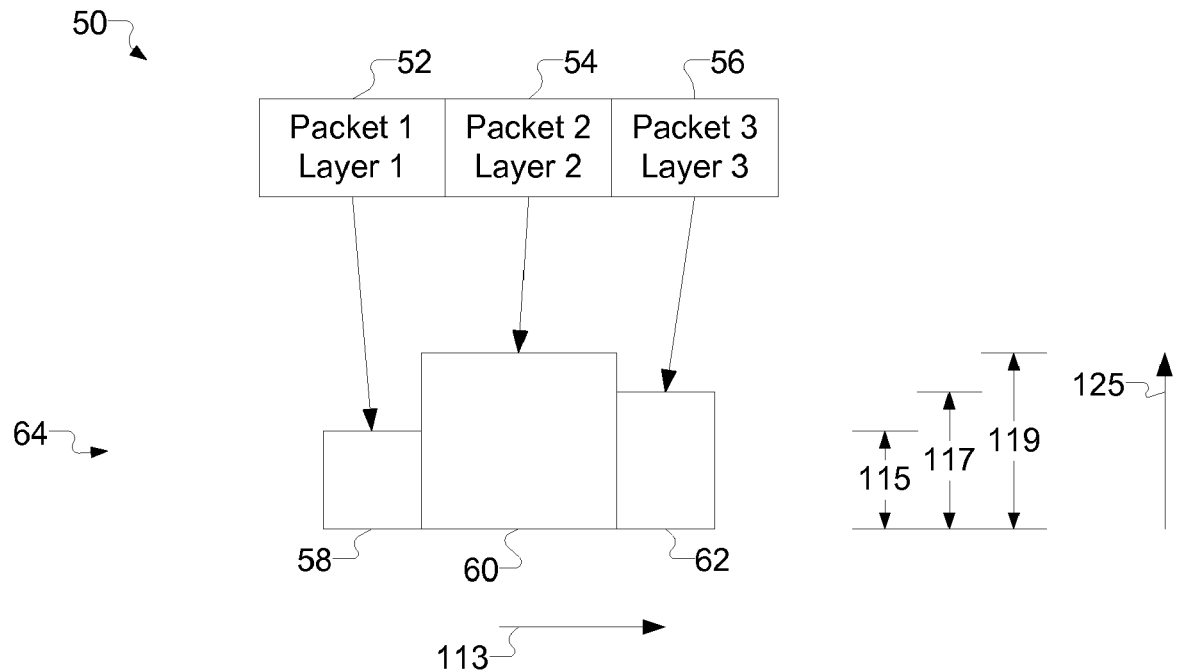
FIG. 2 is a diagram illustrating a correspondence of protocol-layer specific information to symbols in a symbolic representation of protocol-layer information of FIG. 1.

FIG. 2 is a diagram illustrating a correspondence of protocol-layer specific information to symbols in a symbolic representation of protocol-layer information of FIG. 1. Protocol specific information 50 includes protocol layer 1 data 52, protocol layer 2 data 54, and protocol layer 3 data. Symbols 58, 60 and 62 are created, corresponding to the data 52, 54, and 56. In this example, since each of the data 52, 54, and 56 were associated with a protocol layer, each symbol 58, 60 and 62 has a corresponding different height.

The dimension providing distinction between the protocol layers in this example is a distance along the height axis 125. Symbols having a height of height 115 correspond to protocol layer 1. Similarly, symbols having a height 117 and height 119 correspond to protocol layers 3 and 2, respectively. Thus, symbols corresponding to each protocol layer have different heights.

Although heights have been described as a one to one relationship with protocol layers, such a one-to-one relationship need not exist. For example, related layers can have the same height while layers that are unrelated or conceptually distinguished from each other can have different heights. Furthermore, heights can, but need not have an increasing or decreasing relationship with a hierarchy of the protocol layers. For example, the height 117 corresponding to layer 3 is between the heights 115 and 119 corresponding to layers 1 and 2. In addition, a user can assign heights to various protocol layer information to help them personalize, customize or otherwise enhance their analysis of the data stream. That is, height is not a priori determined by the protocol itself.

A width of a symbol along axis 113 can correspond to a length of the corresponding portion of the packet. In this context, a length can refer to both time and/or data size. For example, an eight byte portion can be represented by eight units along the axis 113. Similarly, when other packets or portions of packets are displayed as symbols, those portions can have lengths along axis 113 defined by data length, regardless of data rate. Alternatively, the length along axis 113 can represent time. With different data rates, the same size of data can take different amounts of time to transmit. Thus, the length along axis 113 can be different according to the time taken to transmit the data of the portion associated with the symbol. For example, an eight byte portion at a first data rate will have a first length along axis 113. A second eight byte portion at a second data rate that is one half of the first data rate will have a second length along axis 113 that is double that of the first length.

Figure 3:
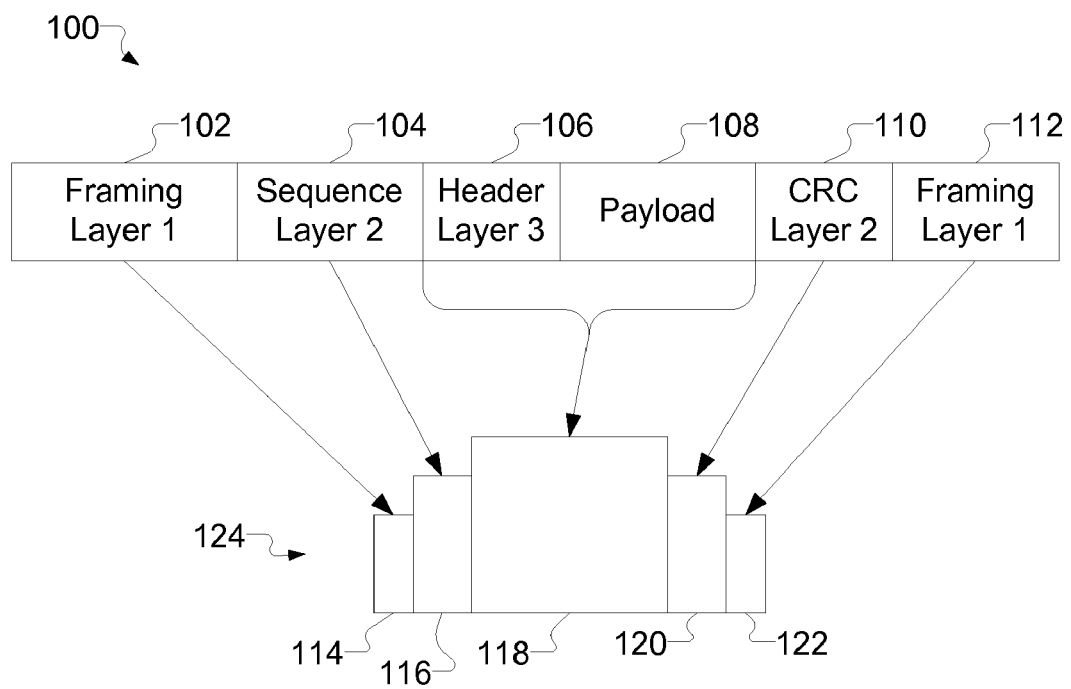
FIG. 3 is a diagram illustrating a correspondence of portions of a packet to symbols in a packet symbol used in FIG. 1.

FIG. 3 is a diagram illustrating a correspondence of portions of a packet to symbols in a packet symbol of FIG. 1. A packet can contain portions complying with multiple protocol layers. A single protocol can define multiple protocol layers. A packet that is compliant with the single protocol can include protocol-specific information associated with each of the different protocol layers. However, protocol layers are not limited to a single protocol. Each protocol layer can be an independent protocol itself. Thus, protocol layers can encompass both layers within a single protocol and layers from multiple protocols.

Packet 100 is divided into portions according to protocol layer. Framing data 102 and 112 comply with a first layer, layer 1. Sequence data 104 and CRC 110 comply with a second layer 2. Header 106 and payload 108 comply with a third layer, layer 3. Although some portions compliant with a particular layer have been illustrated as having a header, a CRC, or the like, protocol layers can define any designation, labeling, organization, content, or the like.

Packet symbol 124 corresponds to packet 100. In this example, symbol 114 and symbol 122 correspond to header 102 and CRC 112 associated with layer 1. Symbol 116 and symbol 120 correspond to header 104 and CRC 110 associated with layer 2. Symbol 118 corresponds to header 106 and payload 108 associated with layer 3.

In addition, in this example, each nesting of a protocol layer within another protocol layer results in a height greater than the height for the previous protocol layer. As a result, layers are distinguished from one another. In addition, the hierarchy of protocol layers is visible. Thus, through visual inspection, the user can understand the protocol layer components of the packet.

Figure 4:
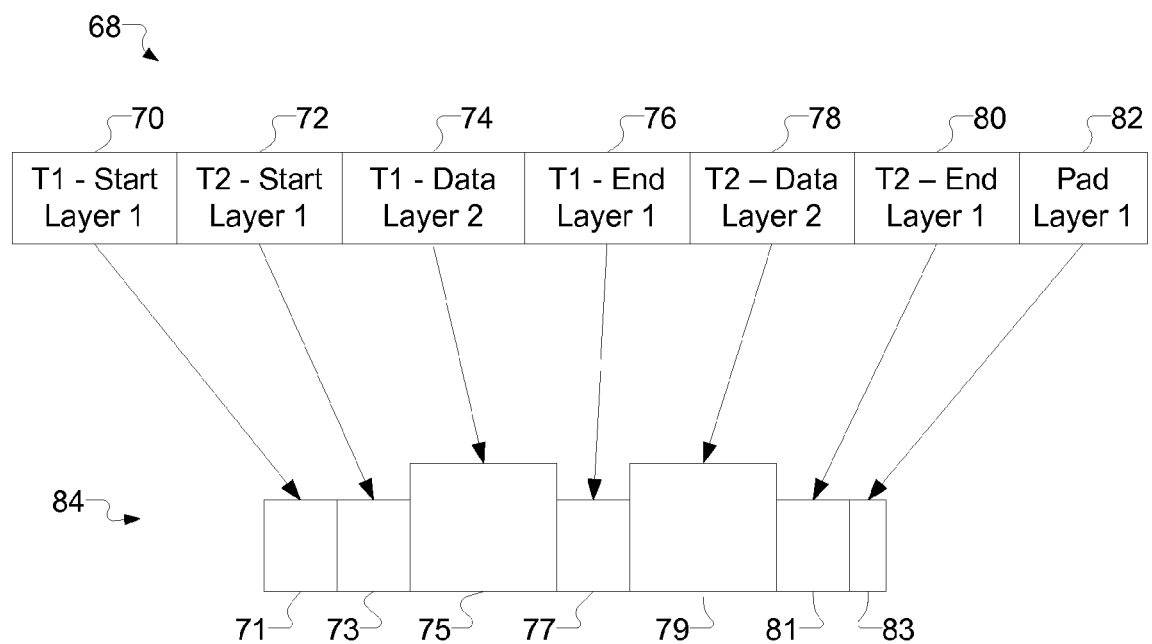
FIG. 4 is a diagram illustrating an example of a correspondence of interleaved protocol-layer specific information to symbols in a symbolic representation of protocol-layer information of FIG. 1.

FIG. 4 is a diagram illustrating an example of a correspondence of interleaved protocol-layer specific information to symbols in a symbolic representation of protocol-layer information of FIG. 1. Protocol-specific information related to multiple transactions can be interleaved within a data stream. The interleaving can come from a variety of sources. A protocol may provide for interleaved transactions. For example, the actual packets for different transactions could be interleaved. In another example, virtual communication channels may be defined by the protocol. In another example, communications can be prioritized, resulting in an interruption of a communication with a higher priority communication. While the actual packets of transactions may not be interleaved, the traffic of the virtual channels, prioritized communications, or the like can be interleaved.

In addition, the protocol-specific information can be a collection of protocol-specific information from multiple sources. For example, the protocol-specific information can include data from multiple connections to a single device. Thus, even if the protocols being used in the protocol-specific information do not support interleaved communications, the collection of the protocol-specific information may have interleaved communications as a result of the multiple sources.

For example, protocol specific information 68 represents such a data stream with interleaved transactions. Packets 70, 74, and 76 are all related to transaction T1. Packet 70 indicates that the transaction T1 is starting. Packet 74 has data associated with the transaction T1. Packet 76 indicates the end of the transaction T1. Packets 72, 78, and 80 represent similar packets for transaction T2.

As can be seen in the sequence of protocol specific information 68, packets of transaction T1 are interleaved with packets of transaction T2. In this example, the symbols associated with the packets of the transactions T1 and T2 are similarly interleaved. Since both symbols 71 and 73 representing packets 70 and 72 are associated with layer 1, the symbols 71 and 73 have the same height.

Figure 5:
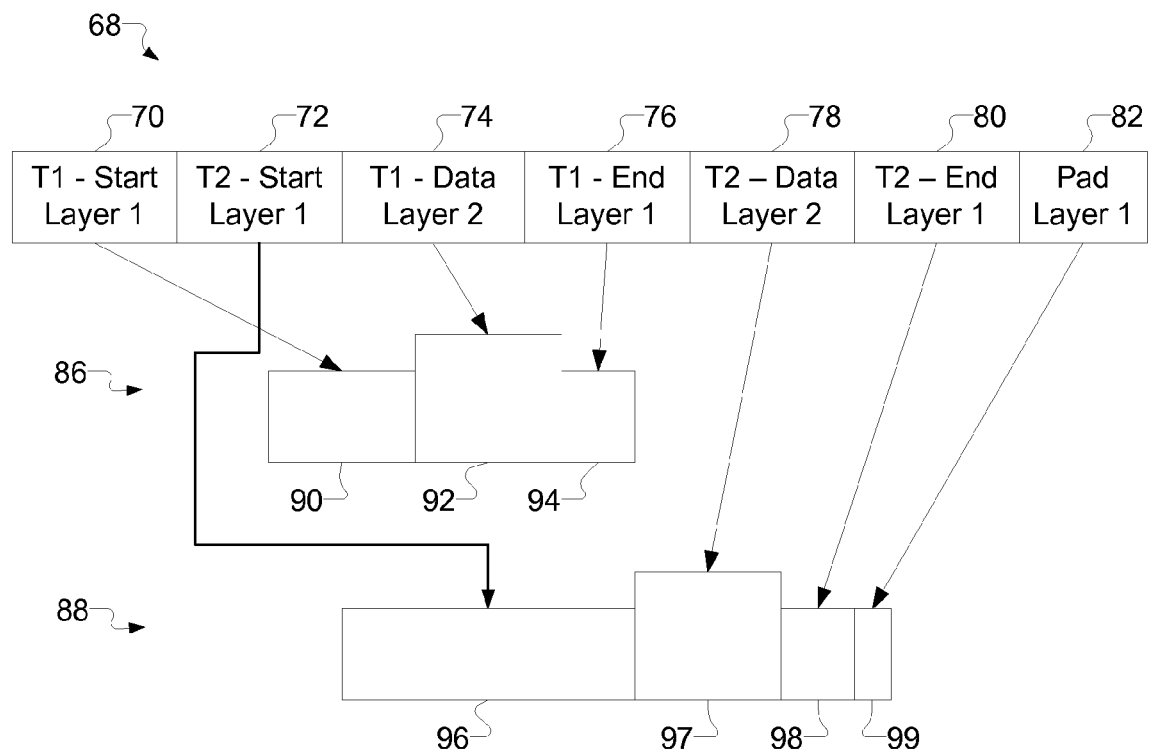
FIG. 5 is a diagram illustrating another example of a correspondence of interleaved protocol-layer specific information to symbols in a symbolic representation of protocol-layer information of FIG. 1.

FIG. 5 is a diagram illustrating another example of a correspondence of interleaved protocol-layer specific information to symbols in a symbolic representation of protocol-layer information of FIG. 1. As described above, protocol-specific information associated with different transactions may be interleaved. A user may be interested in attributes of a single transaction. The symbols for transactions T1 and T2 can be displayed offset from each other to distinguish the transactions. Thus, the symbols for transaction T1 are offset in region 86, while the symbols for transaction T2 are offset in region 88.

FIG. 5 illustrates another example of symbols used to represent protocol layer. As described above, a symbol can have a width that corresponds to time, data length, or the like. In this example, the width of a particular symbol indicates the time until the next related symbol occurs. Symbol 90 illustrates this width. Symbol 90 corresponds to packet 70. In FIG. 4, symbol 71, which also corresponds to packet 70, had a width that extended to symbol 73. However, symbol 73 corresponded to packet 72 of transaction T2. In contrast, in FIG. 5, symbol 90 has a width that extends to symbol 92 representing the next packet for transaction T1. Symbol 90 now conveys the time that passes to the next packet in the transaction T1. In this example, symbols 92 and 94 are similar to the corresponding symbols 75 and 77 because no intervening packets occurred between the corresponding packets 74 and 76 of transaction T1.

Similar to symbol 90, symbol 96 corresponds to packet 72. The next packet of transaction T2, packet 78, does not occur until after the last packet 76 of transaction T1. The symbol 96 extends to reflect the time that has passed waiting for the packet 78.

The collection of symbols 90, 92, and 94 form a coherent symbol for the transaction T. Similarly, the collection of symbols 96, 97, and 98 form a coherent symbol for the transaction T2. The total time taken for each transaction can be easily seen without having to filter out other transactions. In addition, the time relationship of the transactions can be seen. For example, because symbol 96 began in the middle of symbol 90, the user can understand that transaction T2 began before the data packet 74 of transaction T1.

By using symbols having dimensions representing the protocol layers, patterns of information appear in the symbolic representation. For example, multiple protocols, variants of protocols, classes of protocols or the like can have varied distributions of protocol layers, even if the protocol layers are the same. A first protocol may use a second of three layers more so than a second protocol using the same three layers. These protocols, displayed using the same technique, result in different patterns. Thus, a user can determine the protocol from the pattern of the packet symbols.

Figure 6:
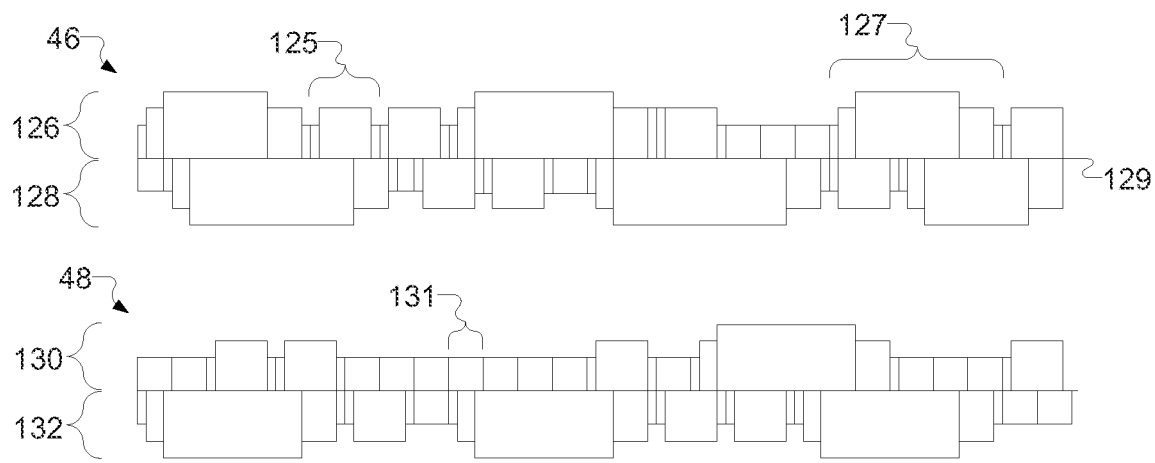
FIG. 6 is a diagram illustrating protocol-layer information for multiple links in a symbolic representation of protocol-layer information of FIG. 1.

FIG. 6 is a diagram illustrating protocol-layer information for multiple links in a symbolic representation of protocol-layer information of FIG. 1. Links 46 and 48 of FIG. 1 are illustrated in more detail. In this example, links 46 and 48 illustrate packets in bi-directional communications. Thus, data can flow in two directions on each link 46 and 48. Packets symbols on link 46 are illustrated as associated with a first direction 126 or a second direction 128. Similarly, symbols for packets sent across link 48 are grouped into a first direction 130 and a second direction 132.

Referring to link 46, packet symbol 127 identifies an example of a packet symbol in the first direction 126. Packet symbol 127 represents three protocol layers contained within the packet through symbols having three different heights. However, all packets do not have data associated with all layers. For example, packet symbol 125 only has data associated with two protocol layers. Accordingly, packet symbol 125 only has symbols with two different heights. Comparing packet symbol 127 to packet symbol 125, it is apparent to the user that packet symbol 127 has data corresponding to an additional protocol layer. Thus, the user is able to obtain this information without having to interrogate fields of the packets themselves.

All packets can, but need not be related to other protocol layers, or even other packets. For example, in link 48, symbol 131 can represent a packet wholly contained in a particular protocol layer. Symbol 131 may represent a physical layer packet maintaining a connection between devices. This is in contrast to packet symbol 127 including symbols corresponding to multiple protocol layers.

Figure 7:
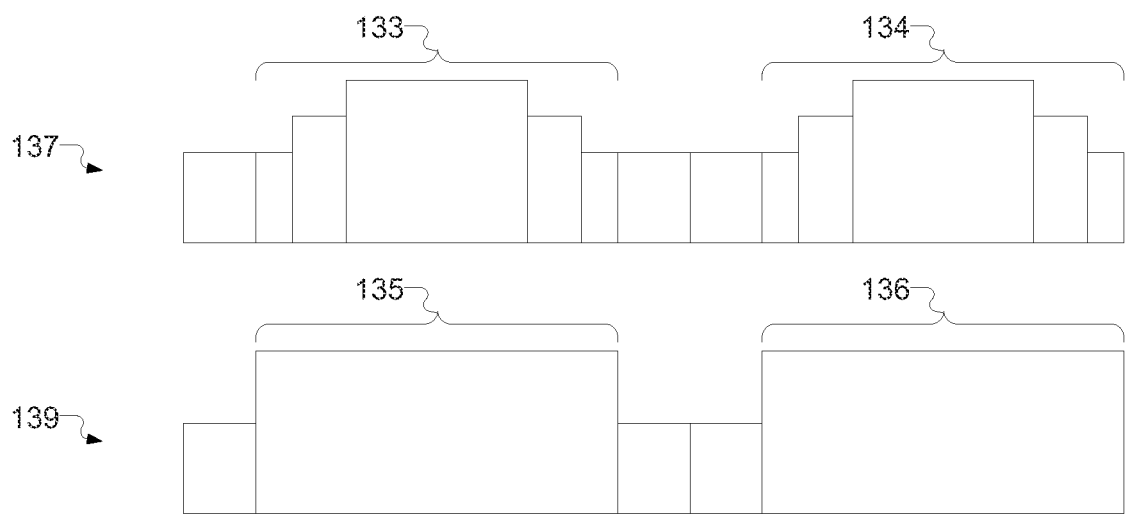
FIG. 7 is a diagram illustrating an example of an encapsulation of protocol layers in a symbolic representation of protocol-layer information of FIG. 1.

FIG. 7 is a diagram illustrating an example of an encapsulation of protocol layers in a symbolic representation of protocol-layer information of FIG. 1. Two symbolic representations 137 and 139 are illustrated. In symbolic representation 137, packet symbols 133 and 134 are represented by discrete symbols for the protocol layers included in the corresponding packets. However, it may be difficult to discern the beginning or end of a packet symbol. To aid in distinguishing packet symbols, a packet or other related symbols can be grouped together and displayed with a symbol or set of symbols having a single height. In symbolic representation 139, packet symbols 133 and 134 are represented by packet symbols 135 and 136. Now, the packet symbols are distinct from other symbols, including those from a protocol layer in common with a start or end of the packet symbol. Although a symbol or set of symbols has a single height, because that height is based on an associated protocol layer, information is conveyed to the user concerning the protocol layer even in situations where only symbols with that height are displayed. The height still retains its distinctive qualities that differentiate it from heights of other protocol layers.

Figure 8:
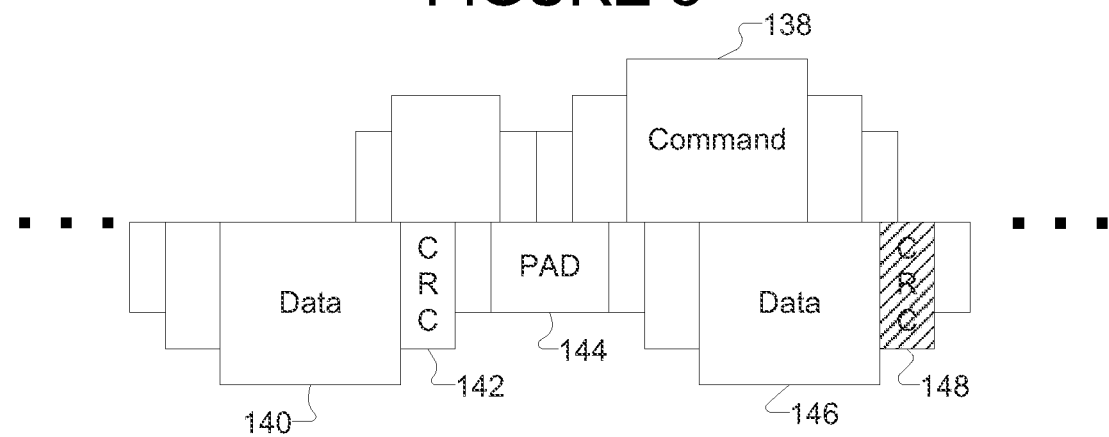
FIG. 8 is a diagram illustrating an example of annotated symbols in a symbolic representation of protocol-layer information of FIG. 1.

FIG. 8 is a diagram illustrating an example of annotated symbols in a symbolic representation of protocol-layer information of FIG. 1. Annotation is the presentation of additional information related to a symbol. The packet symbols are illustrated as annotated with additional information associated with the particular protocol layer. For example, symbol 140 and symbol 146 correspond to layer 3. Both symbol 140 and symbol 146 are associated with portions of the packet containing data. For example, a response to a memory read command may contain the data for the response. Thus, the symbols are annotated with the text "Data". Similarly, symbols 142 and 148 correspond to CRCs at layer 2 for their respective packets. Symbol 144 corresponds to padding added to the data stream at layer 1. Symbol 138 corresponds to a command sent at layer 3.

Furthermore, the annotation is not limited to textual annotation. For example, annotation can include adornment of the symbols with additional symbols. Instead of using a text "Data" label, symbol 140 could be adorned with a symbol associated with a data packet. In another example, the annotation can be a change in the symbol. For example, a change in color, shape, orientation, line weight, line style, shading, or the like can correspond to an error. In this example, symbol 148 has a different infill than symbol 142 to indicate an error with the CRC of symbol 148.

Annotation can improve the user's ability to distinguish errors from other information. Through the application of an appropriate annotation (deformation, ornamentation, color, pattern, infill, shape, additional symbols, or the like), several types of errors can be displayed including severity, source (protocol layer), that the user can immediately identify.

The annotation can, but need not be on every symbol. For example, a user may be interested only in the information of the highest protocol layer. Thus, only the symbol corresponding to the highest layer of the packet will be annotated. The remainder of the protocol layers can remain not annotated.

In an embodiment, the test and measurement instrument can include a symbol manipulation interface 33 configured to adjust the symbolic representation in response to a user input. The annotation described above is an example of the adjustment possible through the symbol manipulation interface 33. For example, the annotation can be added through user interaction. For example, a user can hover over a symbol using a pointing device, such as a mouse, light pen, stylus, or the like. In response, the symbol can be annotated to convey additional information. Alternatively, a user can indicate what information is to be used for the annotation through the symbol manipulation interface 33. In response, the user interface processor can adjust the presentation of the packets in the symbolic representation 26.

Figure 9:
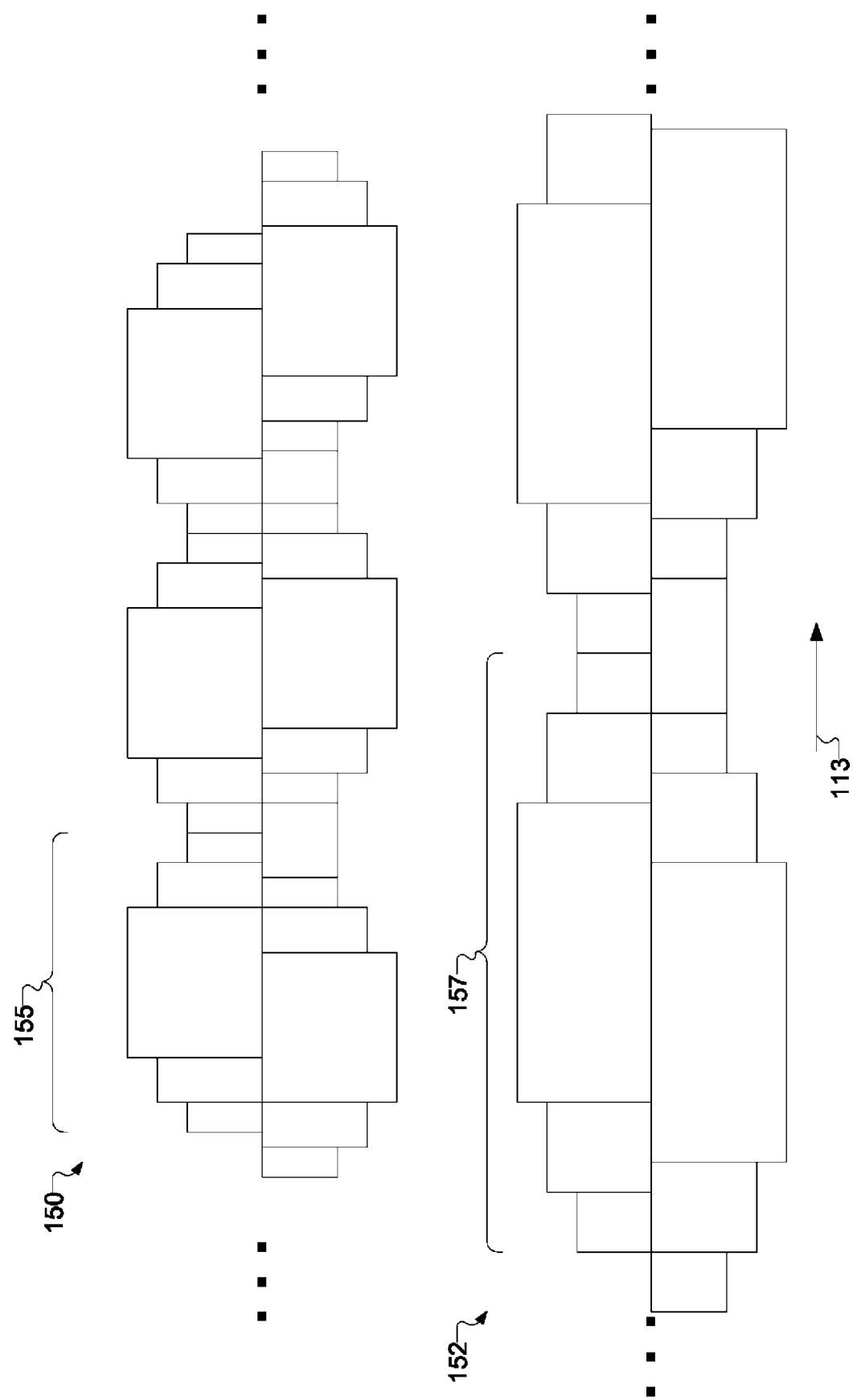
FIG. 9 is a diagram illustrating a correlation of packets having different lengths in a symbolic representation of protocol-layer information of FIG. 1.

FIG. 9 is a diagram illustrating an alignment of links having different lengths in a symbolic representation of protocol-layer information of FIG. 1. Links of different data rates can still be displayed time aligned. Aligning two links of packets includes aligning symbols of the two links along an axis representing time. In this example, axis 113 represents time such that edges of packets symbols are aligned from one link with another.

For example, data over link 150 is transmitted at a first data rate. Data over a second link 152 is transmitted at a second data rate that is one half of the first data rate. The packet symbols 155 and 157 are formed such that lengths along axis 113 correspond to time. Assuming for this example that packet symbols 155 and 157 correspond to equal size packets, it will take twice as long to transmit packet 157 at the second, lower data rate that packet 155 at the higher data rate. Accordingly, packets 155 and 157 are aligned in time even though the data rates are different. The use of the length of the symbols along the axis 113 representing time for the packet symbols, and the placement along the axis 113 allows the user to understand the time relationship In another example, different links can have differing bandwidths. For example, link 150 can be formed of 16 equal data rate lanes while link 152 is formed of 8 equal data rate lanes. Since more bandwidth is available on link 150 than on link 152, the time take for the same packet size will be shorter on link 150 than on link 152. Since the lengths along axis 113 can still represent time, the packets of the links with differing bandwidths can be correlated in time.

As described above, the length along axis 113 can correspond to data size. Using the example above, even with different data rate links, the same size packets would have the same lengths along axis 113. Thus, in the example of FIG. 9, packet symbols 155 and 157 would have the same length along axis 113.

Figure 10:
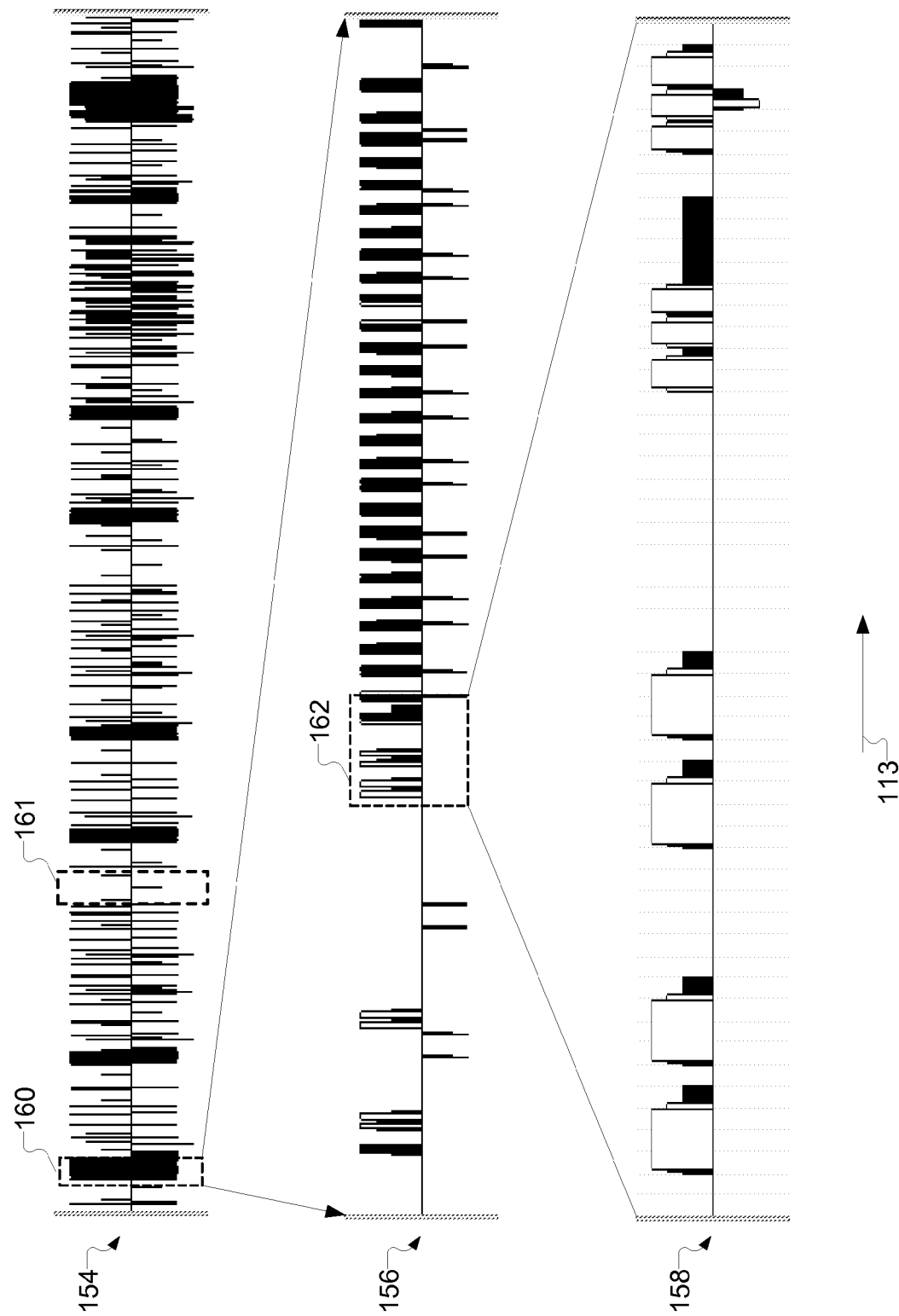
FIG. 10 is a diagram illustrating information available at various zoom levels in a symbolic representation of protocol-layer information of FIG. 1.

FIG. 10 is a diagram illustrating information available at various zoom levels in a symbolic representation of protocol-layer information of FIG. 1. Zooming the symbolic representation increases information density to a greater degree than a box car diagram. In particular, when using a dimension to differentiate protocol layers, the patterns formed due to the differing distances used to distinguish protocol layers are visible at a variety of zoom factors. In contrast to a box-car display, these patterns provide insights into the data.

Symbolic representation 154 is displayed at a first zoom level. In this example, individual symbols of packet symbols, and in fact the packet symbols themselves may not be as wide as a single pixel on the display 14. However, the height of the packet symbols can still be indicated. As a result, the differentiation between the protocol layers can be conveyed while more packet symbols are displayed.

In spite of the limited resolution of the display 14, packet symbols can be combined to still convey the protocol layers of the packet symbols. For example, a peak height can indicate the greatest distance, perhaps corresponding to the highest protocol layer. Intermediate layers can be indicated through a different shade. Thus, even if the displayed symbols for multiple packets are only one pixel wide, a distance of the entire symbol for the packets and a distance of the shading within that symbol can still differentiate the protocol layers.

This example illustrates another aspect of the differentiation of protocol layers along a dimension. The differentiation can, but need not be represented by identical features of a symbol. As described above, a distance of a symbol along a dimension has been described as differentiating protocol layers. However, this distance can refer to a length of a different shading of a symbol. For example, one protocol layer can be represented by a height of a box. Another protocol layer can be represented by a height of a particular shading. Thus, when the shading changes, it delimits the distance along the dimension representing the protocol layer.

Comparing regions 160 and 161, the user can easily gain an understanding of the density of the packets and the protocol layer distribution of data within the packets. For example, in region 160, multiple packet symbols with symbols representing portions in layer 3 are displayed. The packet density is conveyed by the proximity and amount of the packet symbols in the region 160. In contrast, in region 161, only a few packet symbols with layer 1 information are displayed. Again, the packet density is conveyed by the proximity and amount of packet symbols, showing that in region 161 much fewer packets were transmitted. Thus, the user can gain an understanding of the density of the packets. Furthermore, protocol layer information is still evident even at such a zoom level far beyond a point where details would be lost in a box-car display.

Symbolic representation 156 corresponds to the region 160 of symbolic representation 154. Symbolic representation 156 is zoomed in on region 160. When the user zooms in, a number of horizontal pixels available to display a given time is increased. This effectively increases the width of the symbols. Accordingly, more detail can be displayed on the symbols. Although some symbols representing layer specific portions of packets are now distinctly displayed, portions related to other layers may still be combined together.

Symbolic representation 158 corresponds to region 162 of symbolic representation 156. Again symbolic representation is a further zoomed in view of region 162. As a result, the symbolic representation approaches the distinct display of each symbol of each packet symbol. Through the varied zoom levels, a user gains additional information beyond the individual packets. For example, as the symbolic representation is zoomed out, patterns appear showing the communication density over a link.

Furthermore, if multiple links are displayed, the relative communication densities can be time correlated between the links. For example, of one link represents communications between a processor and a hub, and two other links represent communications from the hub to a memory controller and the hub to a peripheral device, the communications between the processor and the hub can be correlated to the communications between the hub and the memory controller or peripheral device. Thus, through visual inspection, the user can determine where communications on one link are routed to other links.

In an embodiment, the test and measurement instrument includes a zoom interface 28 configured to adjust a second dimension of the symbolic representation in response to a user input. In this example, this second dimension is a dimension representing time. The zoom interface 28 can present the user with controls, inputs, displays, or the like as described above to adjust the second dimension. As can be seen in FIG. 10, a user can select a region such as region 160 to indicate a region of interest. In response, the zoom interface 28 adjusts the dimension of the symbolic representation 26 along the axis 113. In this example, the distances along that axis 113 are increased, revealing more detail. Although zooming has been illustrated in FIG. 10 with respect to one dimension, other dimensions can be affected, including the dimension used to differentiate protocol layers.

Figure 11:
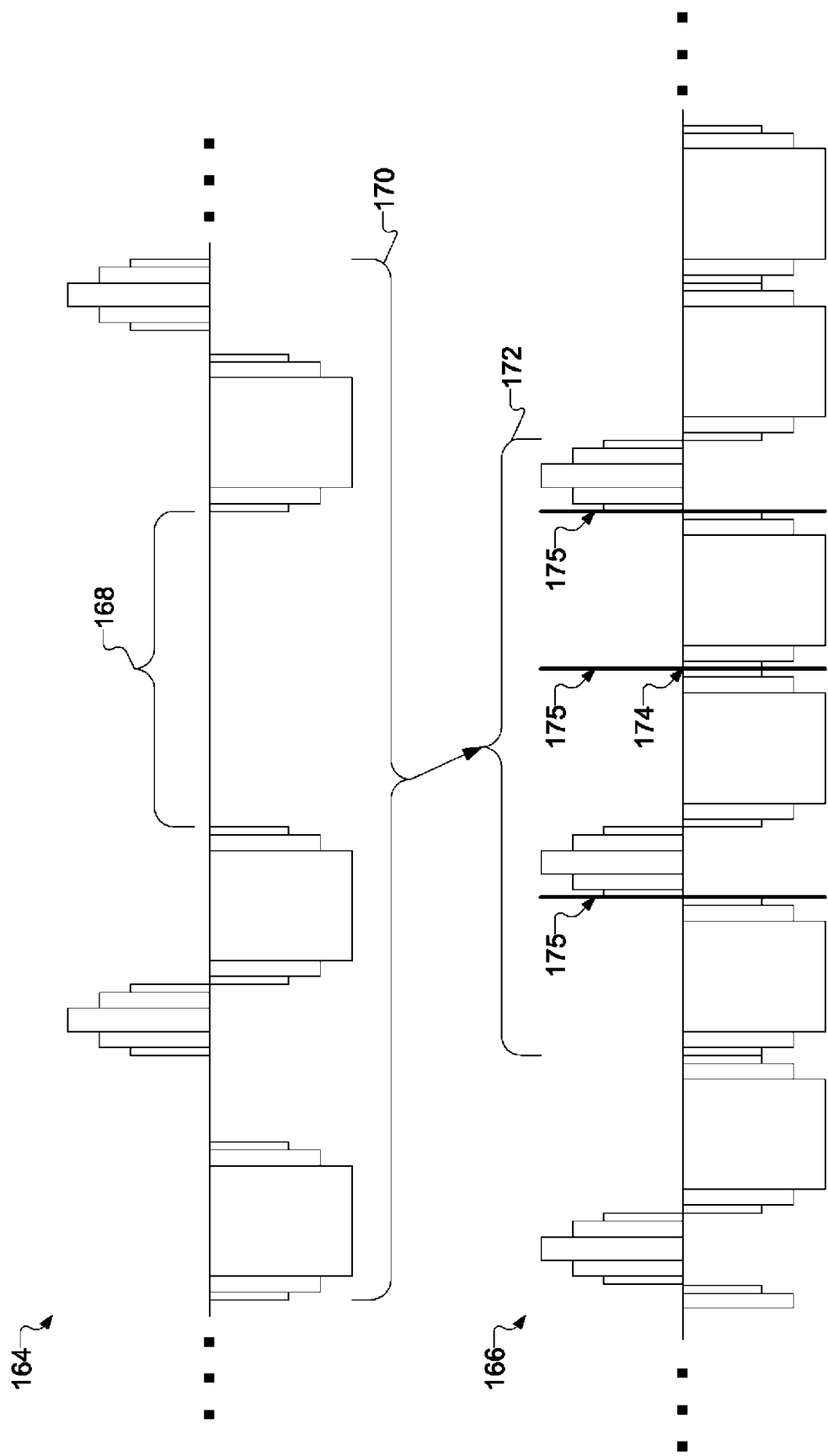
FIG. 11 is a diagram illustrating an example of time compression in a symbolic representation of protocol-layer information of FIG. 1.

FIG. 11 is a diagram illustrating an example of time compression in a symbolic representation of protocol-layer information of FIG. 1. In link 164 packet symbols are displayed with gaps between them. In this example, packet symbols on links are oriented according to time. In this link 164, time passed between the transmission of the packets. In particular, there was a time illustrated by gap 168 during which there were no packets on either direction of the link.

Although the lack of packets has been used to describe a cause for a gap in the symbolic display, other sources are possible for the gaps. For example, packets that exist, yet are filtered out, can result in a displayed gap. In addition, some links may have training packets, padding packets, or the like. Such packets, whether training, padding, filtered, or the like can be referred to as interstitial data. Interstitial data is data that is between the data of interest. Interstitial data also includes the absence of data that can occur between two transmitted packets, resulting in a gap. Thus, when the schematic display is compressed, such interstitial data can be compressed as well, whether displayed or not, just as a displayed gap can be compressed as described above.

Interstitial data can be defined by the user. For example, a user can define certain types of packets as interstitial data. As described above, training packets can be interstitial data. However, a user may be interested in the training packets. Accordingly, the user can indicate that the training packets are not interstitial data. In other words, the user can indicate that the user is not interested in particular types of data, yet interested in other types of data.

Link 166 has the packet symbols of link 164, but link 166 is displayed with time compression. In this example of time compression, portions of the link when no packet symbols were displayed are reduced. For example, gap 168 of link 164 is reduced to zero distance at point 174. The packet symbols over span 170 of link 164 are moved to the packet symbols in span 172 of link 166. In addition, outside of span 172, additional packet symbols are now displayed. By compressing the distance representing times where no packet symbols were displayed, additional packet symbols can be displayed, increasing the information density of the display.

Although links 164 and 166 are illustrated in the same FIGURE, link 166 can replace link 164 in a symbolic display. Alternatively, both links 164 and 166 can be displayed. Thus, the user can have access to both the time compressed and time un-compressed symbolic displays.

The compressed spans can be indicated by symbols. In this example, symbols 175 indicate where the symbolic representation 164 was compressed to form the symbolic representation 166.

In an embodiment, a test and measurement instrument includes a compression interface 30 configured to adjust distances representing interstitial data of the protocol-specific information in response to a user input. As described above, interstitial data can be removed from the symbolic representation. In addition, the user can define interstitial data. The compression interface 30 can allow the user to affect the display of the interstitial data and to define interstitial data.

Figure 12:
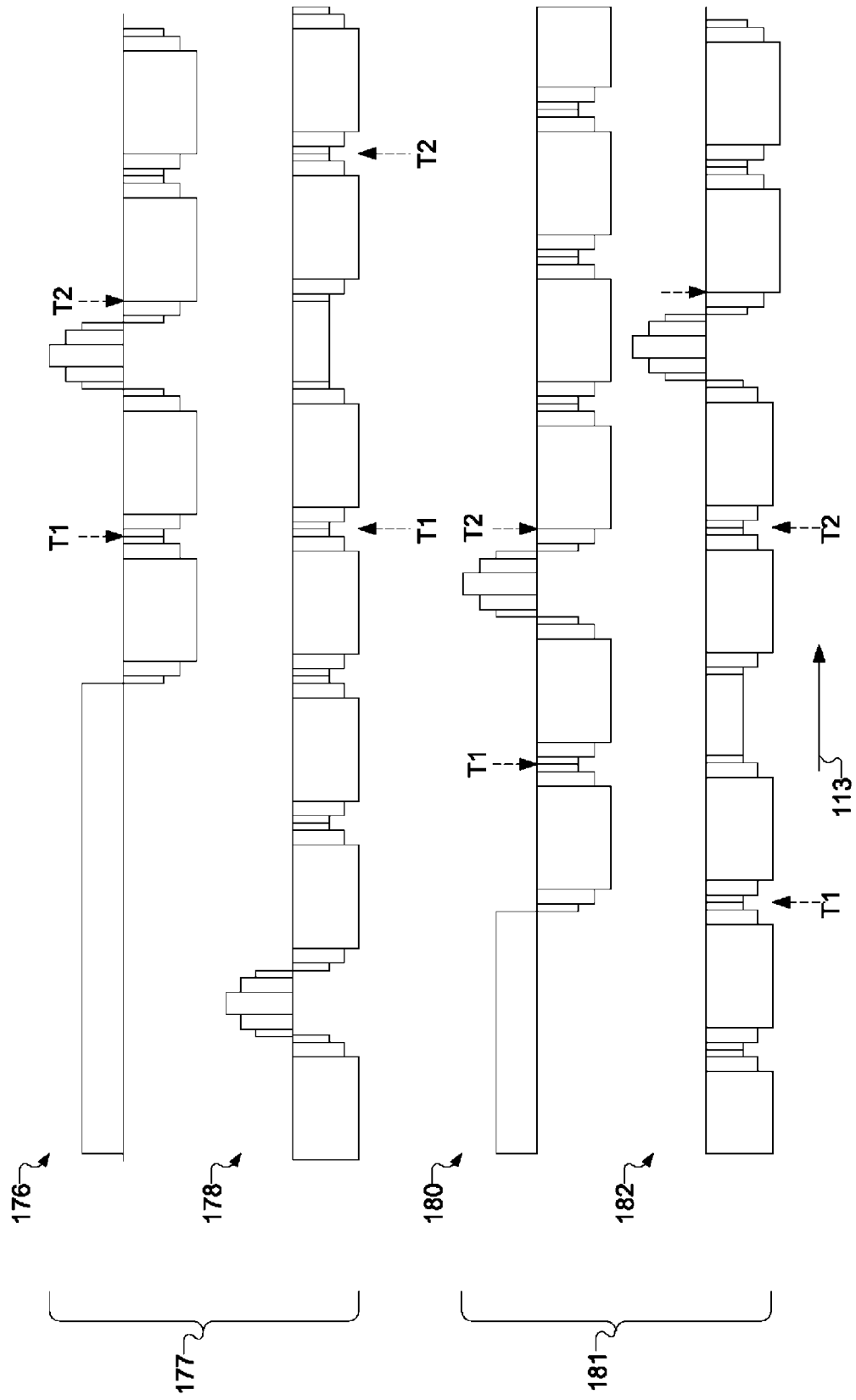
FIG. 12 is a diagram illustrating time alignment in a time-compressed symbolic representation of FIG. 1.

FIG. 12 is a diagram illustrating time alignment in a time-compressed symbolic representation of FIG. 1. When time is compressed as described above, time may no longer be consistent or continuous along the time axis. Multiple compressed links may not be time aligned at all points. In an embodiment, the test and measurement instrument can include an alignment interface 32 configured to align packet symbols of the symbolic representation along an axis.

Symbolic representation 177 includes two time compressed links 176 and 178. Links 176 and 178 are time aligned at time T1. That is, a time T1 in each link 176 and 178 are aligned to a single location along axis 113 representing time. However, in this example, during compression, links 176 and 178 did not have the same time spans removed. As a result, even through points in links 176 and 178 are time aligned at time T1, the time alignment may not hold true for other points in time. For example, points corresponding to time T2 are not aligned along axis 113. Thus, the links 177 and 181 are not time correlated across the entire displayed portion.

The links 176 and 178 can be realigned to a different time through the alignment interface 32. Schematic representation 181 corresponds to schematic representation 177 realigned in time at time T2. However, times T1 in the links 180 and 182 are no longer aligned.

A given schematic representation can, but need not be time aligned at any displayed point. There may exist a point outside of the displayed symbolic representation where the links would be time aligned. Using the alignment interface 32, a user can align the links to a particular point in time. Thus, even if there is no aligned time shown, the user can align the links according to the users input. For example, such input can include a selection of a packet, a time input, or another input associated with a distance long axis 113. Then the schematic representation can be time realigned to align the links at that point.

In addition to a user input, the time alignment can be performed automatically. For example, a first link may be scrolling by in the display. A second link may be similarly scrolling by. The links can be automatically aligned such that at a particular location on the symbolic display 36 will be the same time for both links as the links scroll by.

Although links have been described above as being time aligned, any grouping of symbols can be time aligned. For example, within one link with two directions, each direction can be time compressed, resulting in a lack of time alignment. Through user input or other operation, the directions can be aligned in time.

Figure 13:
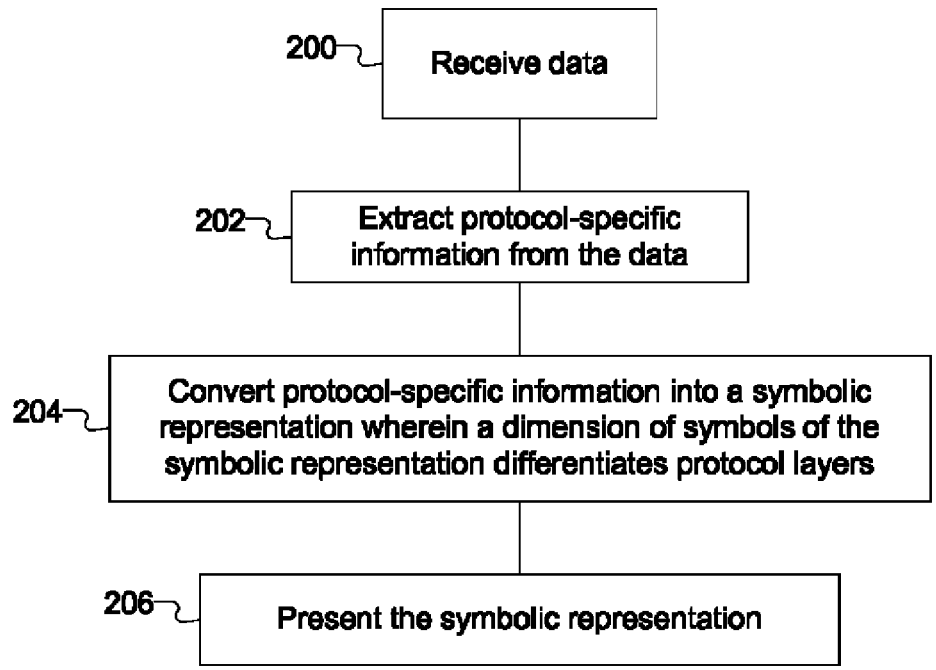
FIG. 13 is a flowchart illustrating a method of displaying protocol-specific information according to an embodiment of the invention.

FIG. 13 is a flowchart illustrating a method of displaying protocol-specific information according to an embodiment of the invention. The method includes receiving data in 200, extracting protocol-specific information from the data in 202, converting protocol-specific information into a symbolic representation in 204, and presenting the symbolic representation in 206 where a dimension of symbols of the symbolic representation differentiates protocol layers.

Receiving the data in 200 can include receiving the data from a variety of sources. For example, a probe may receive signals from a DUT. The probe converts the signals into data. Alternatively, the data may be stored. Receiving the data may include reading the data from the file. Thus, receiving the data in 200 can include any variety of techniques for getting the data into a state to be further processed.

Extracting the protocol-specific information in 202 can be performed using a variety of techniques. Pattern-matching algorithms, data parsers, or the like may interpret the data to determine if the data corresponds to a particular protocol. If so, protocol-specific information is extracted by the algorithm or parser. For example, headers, flags, states, protocol layers, or the like may all be extracted by the algorithm or parser.

Extracting the protocol-specific information in 202 can also include interpreting the data or the currently-extracted protocol-specific information to generate additional protocol-specific information beyond what is directly represented by the data. Extracting the protocol-specific information in 202 is more than just the data within packets or other groupings according to the protocol. For example, any definition, state, result, status, or the like defined by the protocol, regardless of whether it is explicitly present in the data, can become part of the protocol-specific information.

Converting the protocol-specific information into a symbolic representation in 204 includes selecting symbols or attributes of symbols according to the protocol-specific information. As described above, distances along the dimensions are determined using protocol specific information. For example, a first dimension represents a protocol layer and a second dimension represents time. Presenting the symbolic representation in 206 can include displaying the symbolic representation on a display. In particular, the presentation includes an indication of the differentiation of distances along a dimension.

The presentation in 206 has been described as being presented on a display. However, the presentation includes other techniques of presentation. For example, the presentation can include communicating the symbolic representation over a distance to a remote display. In addition, presenting can include the creation of a moving or static image. The presentation includes storing the symbolic representation in a storage medium to be displayed later.

Figure 14:
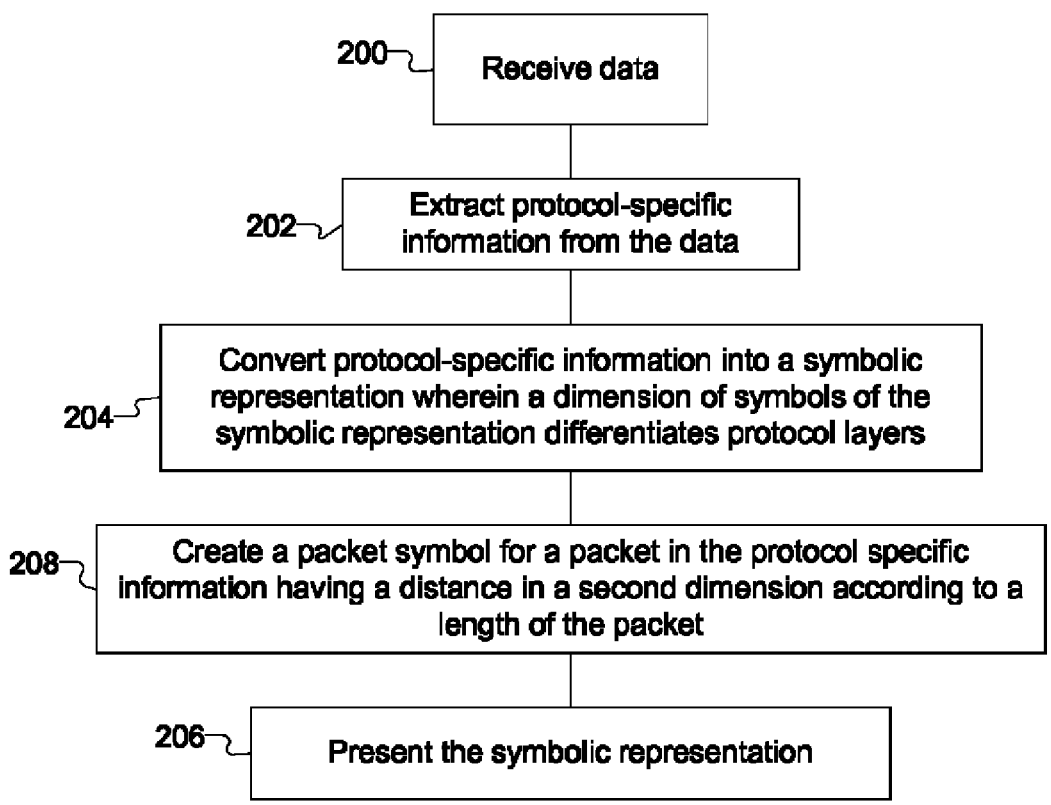
FIG. 14 is a flowchart illustrating how packet symbols are created in a method of displaying protocol-specific information according to an embodiment of the invention.

FIG. 14 is a flowchart illustrating how packet symbols are created in a method of displaying protocol-specific information according to an embodiment of the invention. The method includes creating a packet symbol for the packet, the packet symbol having a distance in a second dimension according to a length of the packet in 208. Creating the packet symbol is an example of converting the protocol specific information into the symbolic representation in 204. Thus, such creation of the packet symbol in 208 can be part of converting the protocol specific information in 204.

Length in the context of a packet symbol can represent multiple concepts. For example, length can be the time taken to transmit the packet. Thus, the length is a length in time. In another example, length can be in units of data. Thus, the length is a size of the packet in bytes, blocks, or other units for the size of data.

In one embodiment, linearly independent dimensions can be used to represent different aspects of the protocol specific information. As illustrated in FIGS. 2-8, the length in the second dimension is orthogonal to the first dimension representing protocol layers. Since the dimensions are linearly independent, different sets of protocol specific information can be independently communicated. In the examples described above, only a two dimensional representation has been illustrated; however, additional dimensions can be added. For example, a third dimension could distinguish additional protocol specific information, such as transaction type.

Figure 15:
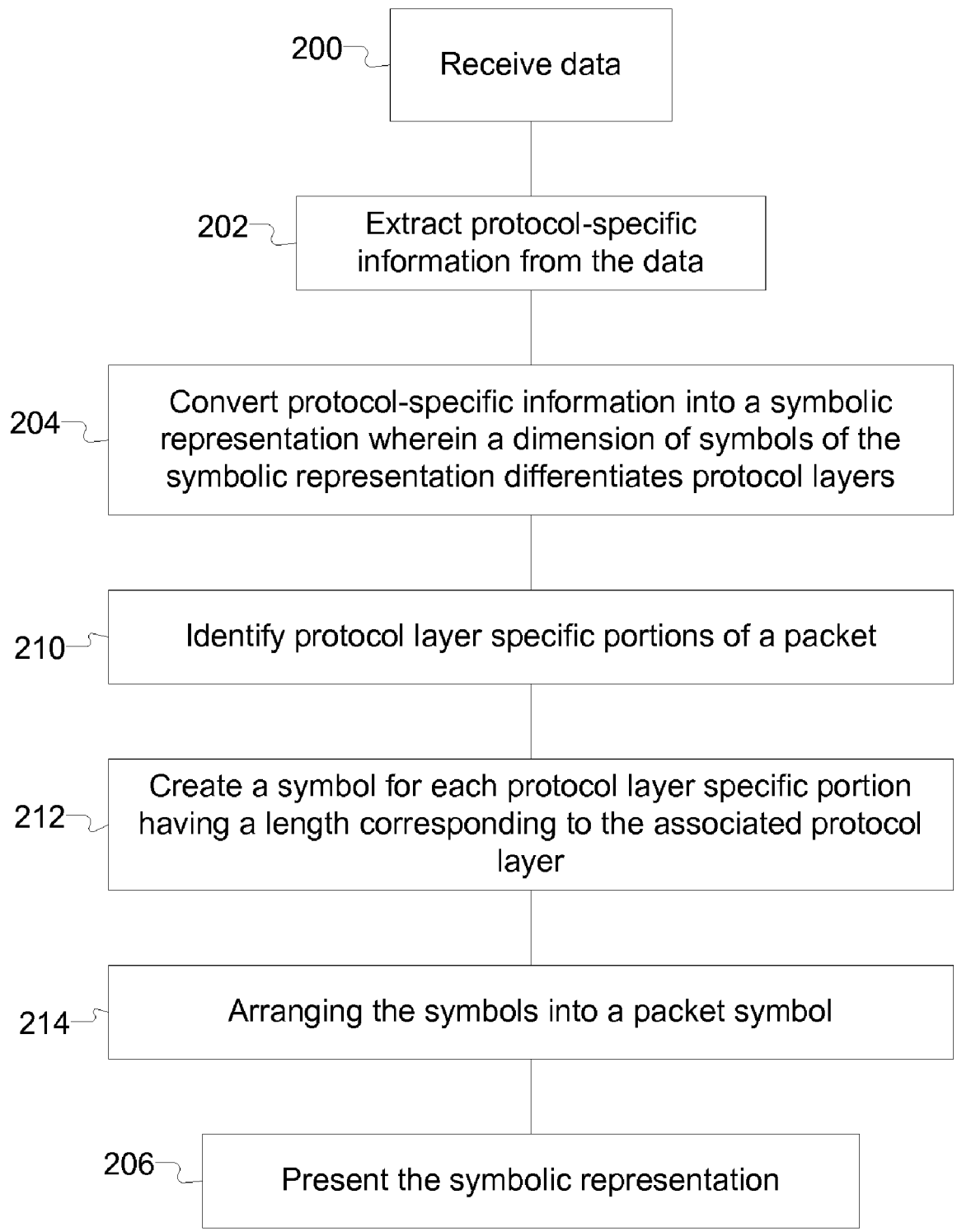
FIG. 15 is a flowchart illustrating how distances corresponding to protocol layers are associated with a packet symbol in a method of displaying protocol-specific information according to an embodiment of the invention.

FIG. 15 is a flowchart illustrating how distances corresponding to protocol layers are associated with a packet symbol in a method of displaying protocol-specific information according to an embodiment of the invention. The method includes identifying protocol layer specific portions of the packet in 210 for a packet in the protocol specific information. For each protocol layer specific portion, the method includes creating a symbol having a distance, the distance corresponding to the associated protocol layer in 212, and arranging the symbols into a packet symbol in 214.

This illustrates a particular example of converting protocol-specific information into a symbolic representation. In this embodiment, the symbolic representation of the packet has multiple symbols. For each of the identified protocol layer specific portion, a symbol is created in 212. As described above, packets can have portions associated with protocol layers. The protocol-layer specific portions can be identified during the extraction of the protocol specific information from the data in 202. Associations of data and protocol layers are examples of protocol specific information.

A protocol-layer specific portion can identify different portions of a packet. In one example, the portions are delineated by continuous sections of data related to particular protocol layers. A change in the data to another protocol layer can indicate a boundary of a portion. Thus, if data in a packet according to a first layer is split into different portions separated by data according to a second layer, multiple portions are created. Alternatively, all data according to a particular layer, regardless of location within the packet, can be represented by a single symbol. As a result, one or more symbols are created in 212 according to portions of a packet corresponding to protocol layers.

Once the individual symbols are created in 212, the symbols are arranged into a packet symbol in 214. The packet symbol is the collection of symbols for the protocol-layer specific portions. The packet symbol can have additional symbols as described above. For example, the packet symbol can be annotated with text or other symbols. The inclusion of the protocol-layer specific symbols can be one of many aspects of the formation of the packet symbols.

Figure 16:
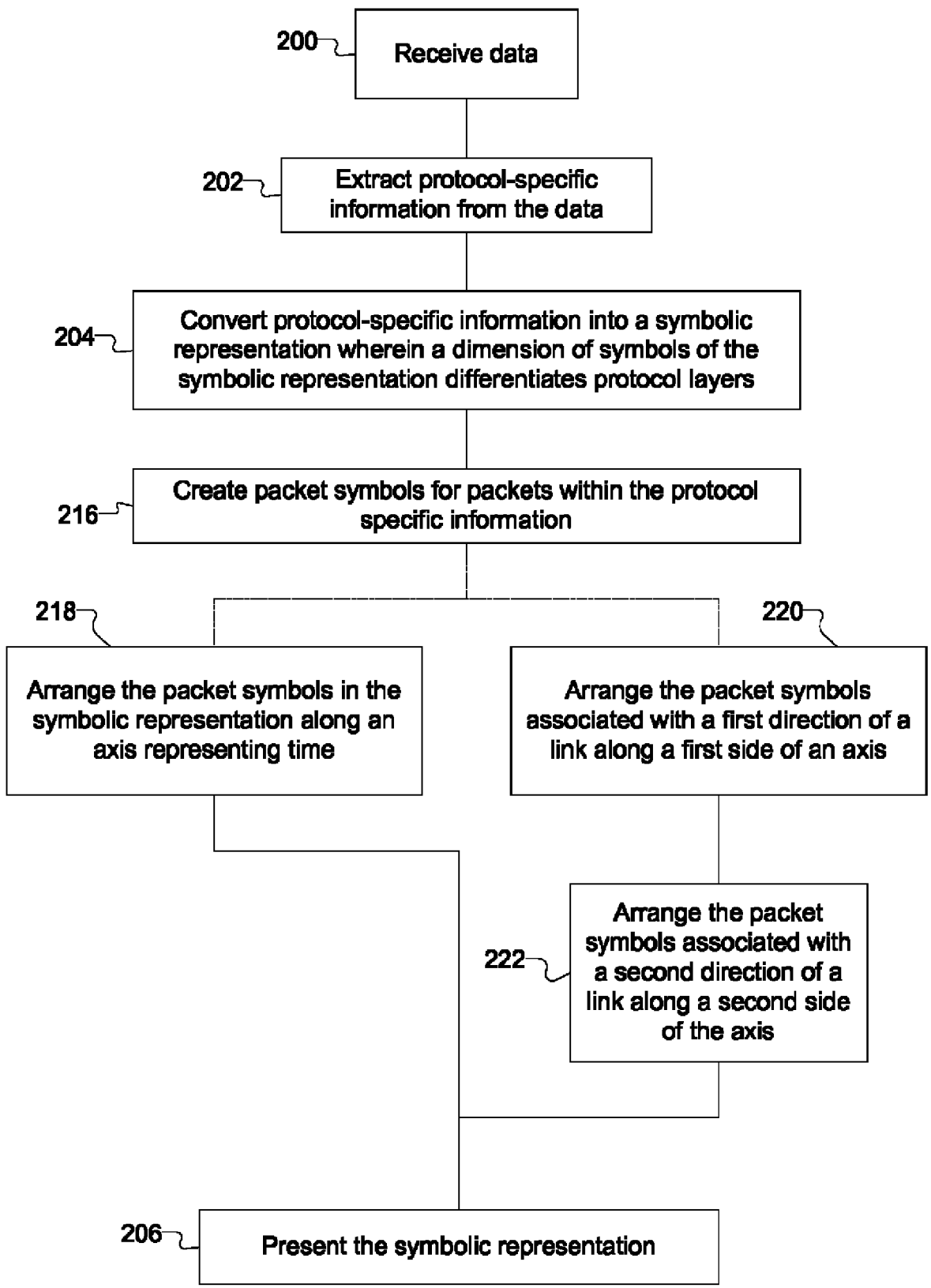
FIG. 16 is a flowchart illustrating how packet symbols are arranged in a method of displaying protocol-specific information according to various embodiments of the invention.

FIG. 16 is a flowchart illustrating how packet symbols are arranged in a method of displaying protocol-specific information according to various embodiments of the invention. In one embodiment, the method includes creating packet symbols for packets within the protocol specific information in 216, and arranging the packet symbols in the symbolic representation along an axis representing time in 218.

Once packet symbols are available, the symbols can be oriented to impart further meaning. The packet symbols can be arranged in time. Packet symbols are arranged in order of the time associated with the packet. Thus, the user can see the time relationship of packets.

In another embodiment, the method includes creating packet symbols for packets within the protocol specific information in 216, arranging packet symbols associated with a first direction of a link along a first side of an axis in 220, and arranging packet symbols associated with a second direction of the link along a second side of the axis in 222.

For a bi-directional link, packets can be sent in two directions. To distinguish the directions, the packes can be arranged on either side of an axis. For example, a line can extend along an axis such as line 129 of FIG. 6. Packet symbols of the first direction 126 of the link 46 are arranged on the upper side of line 129. Packet symbols of the second direction 128 of link 46 are arranged on the lower side of line 129.

An effect of such an arrangement is that a user can see the relationship of the packets either direction. For example, a memory read command can be sent over the first direction 126. With the memory read command comes an expectancy of a response within the data. By arranging the packets on the second direction 128 in relation to the first direction 126, the time that passes before the response can easily be seen.

Although a horizontal line has been illustrated as an example of the axis 139, the axis can follow any direction. For example, the axis can be a vertical line, a curved line, a distance in time, or the like.

FIG. 17 is a flowchart illustrating how packet symbols of various links are aligned in a method of displaying protocol-specific information according to an embodiment of the invention. The method includes creating packet symbols for packets within the protocol specific information in 216, and aligning packet symbols associated with a first link with packet symbols associated with a second link such that substantially similar times represented in both packet symbols of the first link and packet symbols of the second link correspond to a same point along an axis in the symbolic representation in 228.

As described above, packet symbols of two directions of a link can be arranged along an axis. In an embodiment, the axis can represents time. A user may want to see the time relationship of multiple links. Accordingly, the packet symbols can be arranged such that times represented by the packet symbols of the first link are aligned with packet symbols of the second link. This alignment can be continuous such that each point along the axis corresponds to the same time in each packet symbol arranged with reference to the axis.

Although the term link has been used to describe a communication with a source and a destination, a link can, but need not be limited to such a one-to-one communication. For example, a link can connect one source to multiple destinations, multiple sources to one destination, multiple sources to multiple destinations, or the like.

FIG. 18 is a flowchart illustrating how distances corresponding to interstitial data are reduced in a method of displaying protocol-specific information according to various embodiments of the invention. In one embodiment, the method includes reducing a distance along a time axis in the symbolic representation corresponding to interstitial data of the protocol specific information in 224. The reduction of the distance in 224 can, but need not be a reduction to zero. Thus, the interstitial data can be eliminated by reducing it to zero length. Although the reduction of interstitial data has been described above with respect to a link with multiple directions, the reduction of interstitial data can be on a single collection of packet symbols. For example, the reduction can be on a signal direction of a link.

In another embodiment, the method includes reducing a first distance along a time axis in the symbolic representation corresponding to interstitial data in a first direction of a link and a second distance along the time axis in the symbolic representation corresponding to interstitial data in a second direction of the link where the first distance overlaps the second distance in 226. As described above, directions within a link may not have identical locations or times where interstitial data occurs. By reducing the distance corresponding to overlapping interstitial data, time alignment of the packet symbols of the directions or links can still be maintained. Although an overlap within a link has been described, the overlap that is to be reduced can be between other groupings of symbols. For example, an overlap between links can be reduced.

FIG. 19 is a flowchart illustrating how packet symbols are aligned using a selected packet in a method of displaying protocol-specific information according to an embodiment of the invention. As described above, links with different time alignments can be aligned such that the same times in each link are aligned along an axis in the symbolic representation. However, in such a state, other packet symbols are not time aligned. Accordingly, in an embodiment, the method includes selecting a packet in 230, and aligning symbols such that a common point along an axis between links corresponds to substantially the same time in response to the selection 232.

The selection of a packet in 230 can be performed using a variety of techniques. For example, through a pointing device, a user can select a packet symbol in the symbolic representation. Alternatively a packet can be selected automatically.

With the selection, the symbols can be aligned in 232 such that the links are aligned in time. The links can be aligned at the same, or a different point in time. In particular, with different points in time, even though the alignment of other points in time may be affected, a point in time associated with the selected packet can be aligned between the links. Thus, points in the link can be aligned in 232 according to the selected packet in 230.

FIG. 20 is a flowchart illustrating how a subset of protocol layers is presented in a method of displaying protocol-specific information according to an embodiment of the invention. The method includes presenting only symbols in the symbolic representation corresponding to a subset of all protocol layers of the protocol-specific information in 234.

Users can filter or display protocol layers as desired. For example, the user may choose to remove protocol layers from the symbolic representation to better concentrate on a specific layer. As a result, artifacts can be isolated or exaggerated to focus a user's attention.

The subset of the layers can be defined in a variety of ways. For example, a user can select the particular layers to be displayed. A user can select a symbol and hide layer associated with that symbol. Alternatively, a menu or other user interface can provide a user with access to the displayed protocol layers.

FIG. 21 is a flowchart illustrating how packet symbols are annotated in a method of displaying protocol-specific information according to an embodiment of the invention. The method includes annotating symbols of the symbolic representation with layer-specific information in 236. As described above, annotation can include a variety of modifications to symbols in the symbolic representation. In this embodiment, layer-specific information is used to annotate the symbols. For example, a layer can define a checksum. An annotation can be added to the symbol corresponding to that layer of a packet symbol to indicate the success or failure of the checksum.

Another embodiment includes a display layout for displaying data on a test and measurement instrument. The display layout includes a plurality of packet symbols, and an axis along which the packet symbols are sequentially arranged. Each packet symbol corresponds to a packet in the data and includes at least one symbol having a dimension representing a protocol layer of the packet. Thus, the layout of the symbols on the display conveys the protocol layer distribution to the user through a visual representation. Thus, the user can quickly gain an understanding of information related to the protocol layers within the data.

In the display layer each packet symbol can include at least one symbol, where each symbol had a distance along the dimension representing a protocol layer corresponding to a portion of the associated packet. As described above, a packet can have multiple protocol layers within it. Accordingly, a packet symbol representing that packet in the display layout can have symbols that differentiate the protocol layers within the packet.

In addition, multiple second packet symbols can be part of the display layout. Each second packet symbol corresponds to a packet in the data and including at least one symbol having a dimension representing a protocol layer of the packet. However, the second packet symbols are sequentially arranged along the axis on an opposite side of the axis from the first packet symbols. Thus, the second packet symbols are differentiated from other packet symbols by the location in the display layout.

In addition to having symbols with dimensions corresponding to protocol layers, each packet symbol can have at least one symbol having a length in a direction substantially parallel to the axis corresponding to a length of an associated portion of the associated packet. Thus, dimensions of the symbols in the display layout can correspond to other protocol specific information beyond the protocol layers.

An embodiment includes a test and measurement instrument for displaying protocol-specific data. The test and measurement instrument includes means for receiving data, means for extracting protocol-specific information from the data, means for converting protocol-specific information into a symbolic representation, and means for presenting the symbolic representation. A dimension of symbols of the symbolic representation differentiates protocol layers.

In another embodiment, the test and measurement instrument includes means for identifying protocol layer specific portions of a packet in the protocol specific information, means for creating a symbol for each protocol layer specific portion, a distance corresponding to the associated protocol layer, and means for arranging the symbols into a packet symbol.

In another embodiment, the test and measurement instrument includes means for creating packet symbols for packets within the protocol specific information, means for arranging packet symbols associated with a first direction of a link along a first side of an axis, and means for arranging packet symbols associated with a second direction of the link along a second side of the axis.

In another embodiment the test and measurement instrument includes means for reducing a distance representing interstitial data of the protocol specific information.

Although links and directions have been used to describe groupings of symbols such as packet symbols, the links and directions can, but need not be associated with physical connections in a DUT. For example, a link can be an abstract division of the communications over an actual physical link.

As described above, various combinations of acquisition systems, processors, and displays can form a test and measurement instrument. The means recited above include such combinations. Any of the above recited methods may be implemented in a test and measurement instrument through means for performing the methods such as those combinations described above.

Another embodiment includes an article of machine readable code embodied on a machine readable medium that when executed, causes the machine to perform any of the above described operations. As used here, a machine is any device that can execute code. Microprocessors, programmable logic devices, multiprocessor systems, digital signal processors, personal computers, or the like are all examples of such a machine.

Although particular embodiments have been described, it will be appreciated that the principles of the invention are not limited to those embodiments. Variations and modifications may be made without departing from the principles of the invention as set forth in the following claims.

The invention claimed is:

1. A method of analyzing and displaying protocol-specific data for use in a test and measurement instrument, comprising:

receiving communications data from a system under test using an acquisition system of the test and measurement instrument;

extracting protocol-specific information from the communications data using a processor;

converting said protocol-specific information into a symbolic representation using the processor; and displaying the symbolic representation on a display device; wherein each symbol of the symbolic representation is a graphical symbol and is a polygon; and a first dimension of the graphical symbols of the symbolic representation differentiates protocol layers;

wherein each protocol layer is represented by a different distance along the first dimension, the greatest distance corresponding to a highest protocol layer in the packet; and wherein the packet symbol has a distance in a second dimension according to a length of the packet; and further comprising:

reducing a first distance along a time axis in the symbolic representation corresponding to interstitial data in a first direction of a link and a second distance along the time axis in the symbolic representation corresponding to interstitial data in a second direction of the link where the first distance overlaps the second distance.

2. The method of claim 1, further comprising:

creating packet symbols for packets within the protocol specific information; and arranging the packet symbols in the symbolic representation along an axis representing time.

3. The method of claim 2, further comprising:

offsetting packet symbols for related packets from packet symbols for unrelated packets.

4. The method of claim 1, further comprising:

creating packet symbols for packets within the protocol specific information;

arranging packet symbols associated with a first direction of a link along a first side of an axis; and arranging packet symbols associated with a second direction of the link along a second side of the axis.

5. The method of claim 1, further comprising:

selecting a packet; and aligning symbols such that a common point along an axis between a plurality of links corresponds to substantially the same time in response to the selection.

6. The method of claim 1, further comprising:

presenting only symbols in the symbolic representation corresponding to a subset of all protocol layers of the protocol-specific information.

7. The method of claim 1, further comprising:

annotating symbols of the symbolic representation with layer-specific information.

8. A method of analyzing and displaying protocol-specific data for use in a test and measurement instrument, comprising:

receiving communications data from a system under test using an acquisition system of the test and measurement instrument;

extracting protocol-specific information from the communications data using a processor;

converting said protocol-specific information into a symbolic representation using the processor; and displaying the symbolic representation on a display device; wherein each symbol of the symbolic representation is a graphical symbol and is a polygon; and a first dimension of the graphical symbols of the symbolic representation differentiates protocol layers;

wherein each protocol layer is represented by a different distance along the first dimension, the greatest distance corresponding to a highest protocol layer in the packet; and wherein the packet symbol has a distance in a second dimension according to a length of the packet; and further comprising:

creating packet symbols for packets within the protocol specific information; and aligning packet symbols associated with a first link with packet symbols associated with a second link such that substantially similar times represented in both packet symbols of the first link and packet symbols of the second link correspond to a same point along an axis in the symbolic representation.

9. A test and measurement instrument for displaying data, comprising:
- an acquisition system configured to receive an input signal, the input signal being a communications signal;
- a processor coupled to the acquisition system and configured to extract protocol-specific information from said received signal, and generate therefrom a symbolic representation of protocol-specific information within the input signal; and
- a user interface coupled to the processor for receiving user-entered data; and
- a display device configured to display symbols of the symbolic representation; wherein
- each symbol of the symbolic representation is a graphical symbol and is a polygon; and wherein
- a first dimension of the symbols of the symbolic representation differentiates protocol layers, the greatest distance corresponding to a highest protocol layer in the packet; and a second dimension of the symbols indicates packet length: and
- a symbol manipulation interface configured to adjust the symbolic representation in response to a user input;
- said symbol manipulation interface creating packet symbols for packets within the protocol specific information; and
- aligning packet symbols associated with a first link with packet symbols associated with a second link such that substantially similar times represented in both packet symbols of the first link and packet symbols of the second link correspond to a same point along an axis in the symbolic representation.

10. The test and measurement instrument of claim 9, further comprising:
- a zoom interface configured to adjust a second dimension of the symbolic representation in response to a user input.

11. The test and measurement instrument of claim 9, further comprising:
- a compression interface configured to adjust distances representing interstitial data of the protocol-specific information in response to a user input.

12. The test and measurement instrument of claim 9, further comprising:
- an alignment interface configured to align packet symbols of the symbolic representation along an axis in response to a user input.

* * * * *